(12) United States Patent
Liebermann

(10) Patent No.: US 7,446,669 B2
(45) Date of Patent: Nov. 4, 2008

(54) DEVICES FOR USE BY DEAF AND/OR BLIND PEOPLE

(75) Inventor: Raanan Liebermann, 79 Bayard Ave., North Haven, CT (US) 06473

(73) Assignee: Raanan Liebermann, North Haven, CT (US)

( * ) Notice: Subject to any disclaimer, the term of this patent is extended or adjusted under 35 U.S.C. 154(b) by 1302 days.

(21) Appl. No.: 10/612,159

(22) Filed: Jul. 2, 2003

(65) Prior Publication Data

US 2005/0004801 A1    Jan. 6, 2005

(51) Int. Cl.
*G09B 21/00* (2006.01)

(52) U.S. Cl. ............ 340/825.19; 341/21; 341/22; 434/112; 434/114; 434/116; 348/62; 704/271

(58) Field of Classification Search ............ 341/22, 341/21; 340/825.19, 990, 906; 704/271; 379/52, 93.17; 348/62; 434/112, 114, 116
See application file for complete search history.

(56) References Cited

U.S. PATENT DOCUMENTS

| | | | | | |
|---|---|---|---|---|---|
| 4,062,371 A | * | 12/1977 | Bolen | ........................ | 135/66 |
| 4,969,096 A | * | 11/1990 | Rosen et al. | ................ | 434/112 |
| 5,987,103 A | * | 11/1999 | Martino | ................... | 379/93.17 |
| 6,044,382 A | * | 3/2000 | Martino | ...................... | 715/234 |
| 6,490,343 B2 | * | 12/2002 | Smith et al. | ................... | 379/52 |
| 6,957,750 B1 | * | 10/2005 | Trudell | ....................... | 222/174 |
| 2006/0129308 A1 | * | 6/2006 | Kates | ........................ | 701/200 |

* cited by examiner

*Primary Examiner*—Timothy Edwards, Jr.
(74) *Attorney, Agent, or Firm*—Bachman & LaPointe, P.C.

(57) ABSTRACT

A device for use by a deafblind person is disclosed. The device comprises a first key for manually inputting a series of words in the form of a code, a second key for manually inputting an action to be performed by the device, a third key for manually inputting a user preference, and a fourth key for manually inputting communication instructions. The device further has an internal processor programmed to carry out communication functions and search and guide functions. The device has various safety and security functions for pedestrians or persons in transit. In a preferred embodiment, the device comprises an electronic cane known as an eCane. Also disclosed is a system for allowing a deafblind person to enjoy television programs.

39 Claims, 16 Drawing Sheets

DEVICES FOR USE BY DEAF AND/OR BLIND PEOPLE

BACKGROUND OF THE INVENTION

The present invention relates to a device, which can be used by deaf and/or blind people to communicate with others and to ascertain their environment. It also provides safety and security elements.

Blind individuals can be assisted by making use of guide dogs or seeing dogs, where they respond to the sounds made by the dogs, such as a bark or by the leading role of the dogs in walking, halting, etc., as well as navigation aspects. Deaf individuals sometimes use hearing dogs that have been trained to recognize sounds that require alerting their deaf owners and respond by physical means, thereby alerting their human companion to a situation on hand. However, the situation is different when it comes to persons who are both deaf and blind (deafblind) who cannot fully utilize the benefit of either sound or sight/motion cues provided by such dogs that have been appropriately so trained.

Yet, deafblind individuals cherish their freedom and value their independence, at least if not more, than those who are not deprived of the hearing and seeing sense, and often without the need for another human being or animal companion to assist in that task.

Attempts to assist blind people in navigation have been introduced into the market, such attempts utilize the global positioning system (GPS). However, these welcome attempts have failed indoors or in close proximity to tall buildings or structures. Further, these attempts do not provide solutions for the deafblind.

SUMMARY OF THE INVENTION

Accordingly, it is an objective of the present invention to provide a device which enables a deafblind individual to become more integrated into the hearing and seeing society without the need to rely on another human being who is not deprived of the seeing and hearing senses or an animal companion.

The foregoing objective is attained by the devices of the present invention.

In accordance with the present invention, a device for use by an individual, such as a deafblind person is provided. The device broadly comprises first means for manually inputting a series of words in the form of a code, second means for manually inputting an action to be performed by the device, third means for manually inputting a preference, and fourth means for manually inputting communication instructions. The device also comprises an internal processor for carrying out communication functions and search and guide functions as well as other programs for enhancing the user's capabilities and experience.

Also disclosed herein is a system for allowing a hearing impaired and/or blind person to enjoy television. The system broadly comprises input means for receiving information about an oral presentation being made as part of the television program, as well as dynamic scene changes on the TV screen and means associated with the input means for transmitting a signal to at least one body part of the person representative of words being spoken as part of the oral presentation and/or the dynamic scene on the TV screen.

Other details of the device to be used by deaf and/or blind people, as well as other objects and advantages attendant thereto are set forth in the following detailed description and the accompanying drawings wherein like reference numerals depict like elements.

DETAILED DESCRIPTION OF THE PREFERRED EMBODIMENT(S)

Figure 1:
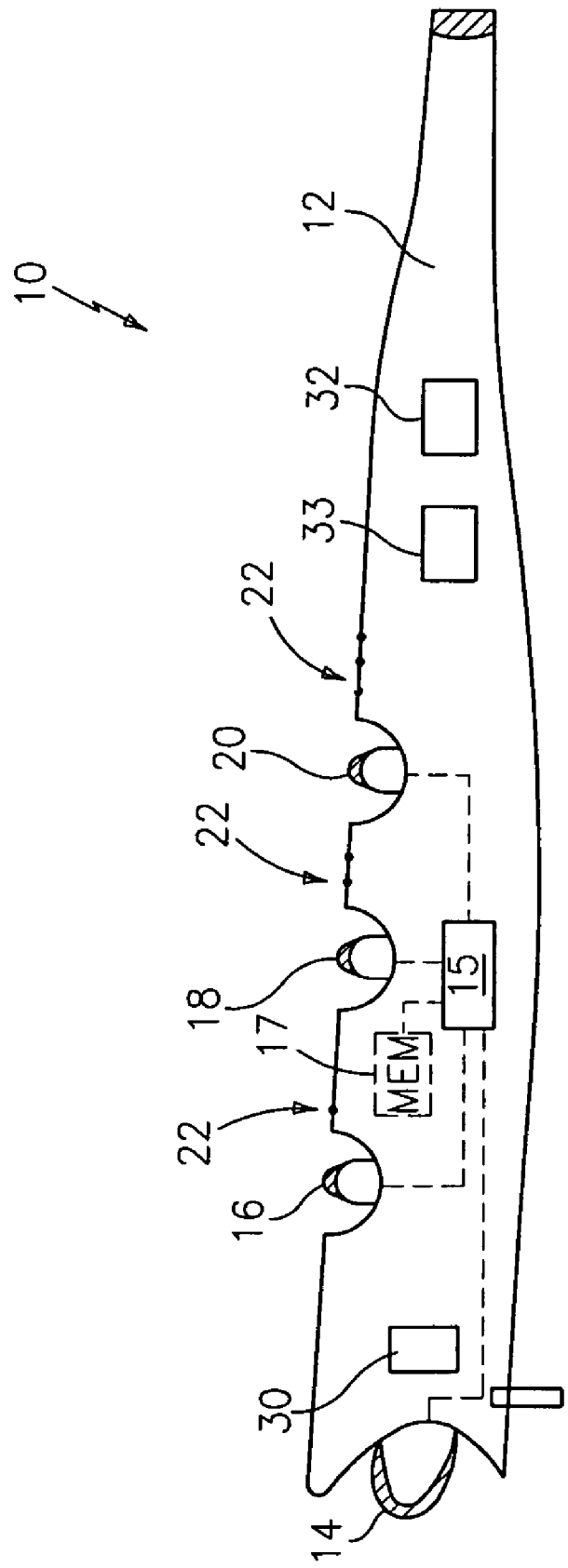
FIG. 1 is a representation of an electronic cane (eCane) in accordance with the present invention.

Referring now to the drawings, FIG. 1 illustrates a first embodiment of a device 10 in accordance with the present invention. In this embodiment, the device 10 takes the form of a cane 12 which can be used by a blind person, a deaf person, or a deafblind person. The cane 12 may be termed an "eCane". The eCane 12 can exist as a single unit or can be formed by a unit that may be a cane and a related part that can be carried or worn on the body by the deafblind person and which contains some of the parts and functions of the overall eCane.

As can be seen in FIG. 1, the cane 12 has a top key 14, that could be located at the tip of the cane 12. The key 14 is a self-expression key (SEK), that the user can depress in a series of short and/or long depressions in order to send a message. The cane 12 may have at least three other keys 16, 18, and 20, which can be located somewhat below the key 14. The first of these, key 16, may be called an Action Key (AK). Somewhat below the AK 16 is the key 18 which may be called the Selection Preference Key (SPK). The fourth key 20 is located below the third key 18 and may be called the Communication Key (CK). The Communication Key 20 handles all kinds of communications desired by the deafblind. Such communication could be a telephone call with all sorts of individuals or even animal companions, communication with hearing or deaf persons, or with other deafblind individuals in an eCane to eCane communication.

The Action Key 16 activates such actions as call/dial, for example, on a mobile phone, search and guide (say to a bathroom or the toilet), or communication with another person. The SPK key 18 fine tunes the request or intent of the user.

The keys 16, 18, and 20 may each have one or more rings 22 around them, so that they become noticeable by touch. Further, each has a series of elevated dots on or below that signify whether it is the second, third, or fourth ring.

If desired, the cane 12 could be programmed to mandate a two-pressure activation, much like a double pull of a rifle trigger, to ascertain that the correct key has been activated.

In addition to the keys discussed above, the eCane 12 may also have one or more of a mobile phone segment, an ON/OFF switch 30, a processor or preprogrammed chip 15, a memory 17 connected to the processor or chip 15, a data holding unit such as an EPROM, one or more speakers, one or more microphones, a transducer, a vibrating element, a RF transceiver as part of a reception and communication unit, an antenna that may be directional (rotationally affected) thereby enabling to determine variation in reception strengths, a distance measuring device to an EC unit, a serial/parallel/USB port enabling connection to a PC or other electronic devices, RJ-11 connectivity element, a power supply such as batteries with an optional recharge mechanism and electrical outlet connectivity, and software that enables the operation of the cane 12 including such software modules as text to speech, speech recognition, lip reading, etc.

The cane 12 preferably has an internal preprogrammed processor 15 and memory 17, which contains the software enabling operation of the cane and one or more of the aforesaid modules. The processor 15 and memory 17, which may be any one or more of the memory units available in the art, such as RAM, EPROM, or Flash card, may be electrically attached to the keys 14, 16, 18, and 20 using any suitable means known in the art. The processor 15 may be programmed so that depressing any two of the keys 16, 18 and 20 automatically triggers an emergency (i.e. "911" in the U.S.) call from the cane 12.

Depressing the ON/OFF switch 30 activates the cane 12. The action key 16 may be used to activate a certain procedure, which the user confirms by a single depression on the self-expression key 18. The key 14 may be depressed in successive short or long depressions that can be perceived as a code, such as Morse code, enabling the cane 12 to become a transmitting medium for the user.

Figure 2:
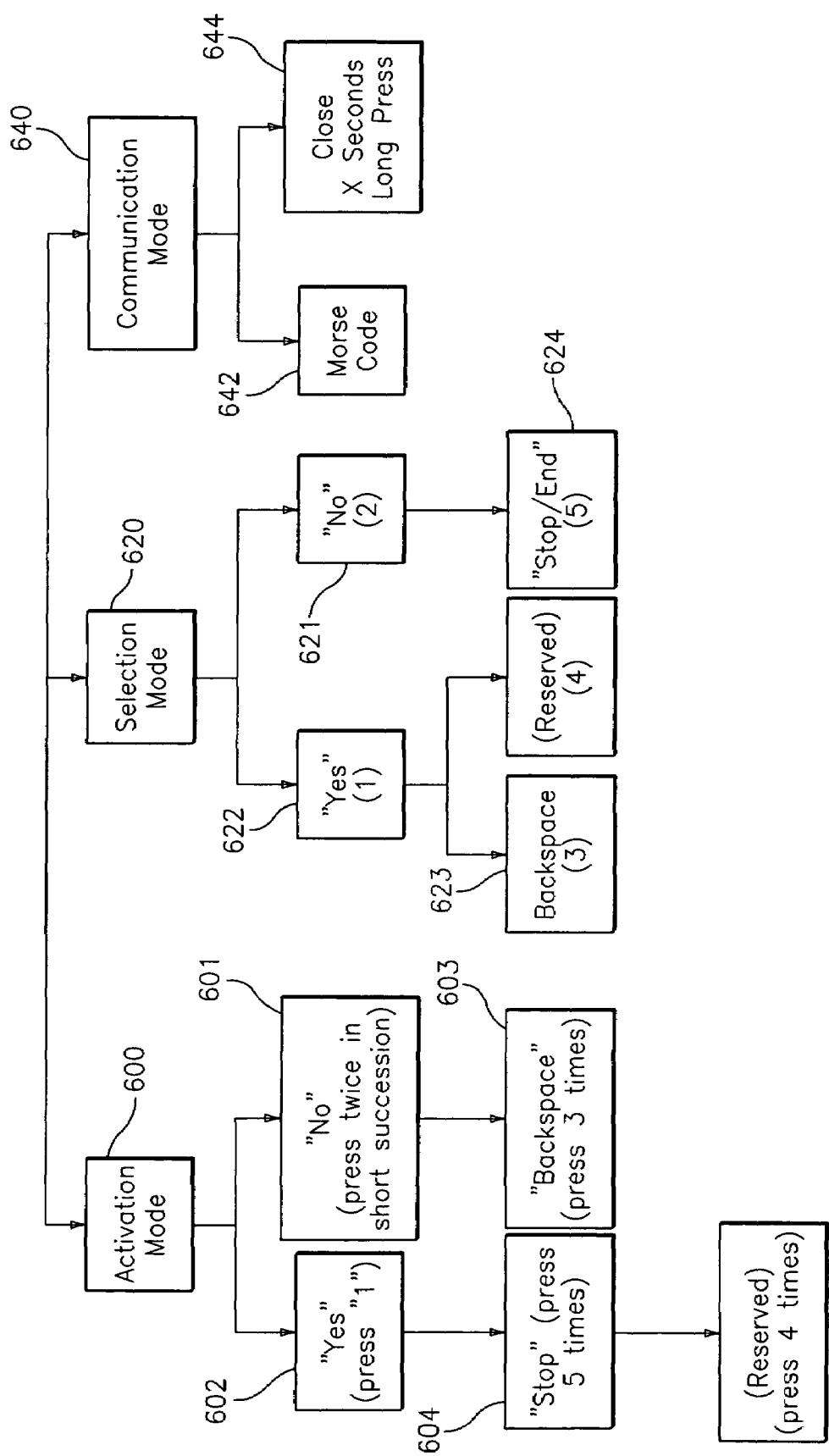
FIG. 2 is a flow diagram illustrating a common key procedure.

FIG. 2 illustrates schematically a common key procedure, which can be used with the cane 12 and that is the self-interactive tool between the deafblind person and the eCane 12. Pressing key 20 activates a communication mode 640, pressing SPK key 18 activates a selection mode 620, and pressing key 16 enables an activation mode 600. The common key procedure is in fact the communication between the deafblind person and the eCane 12. It provides the ability to govern the operation by selecting an appropriate key, receiving questions through vibrations, and responding with confirmation or denial by pressing key 14 the appropriate number of times. For example, if the cane 12 is in the activation mode 600 or the selection mode 620, pressing key 14 once means "yes" (boxes 602 and 622) and twice in short succession means "no" (boxes 601 and 621). A user can go backwards on an answer or ask for repeat of a vibrated question as is shown in boxes 603 and 623, or ultimately end the session by pressing key 14 five times as shown in boxes 604 and 624. In the communications mode 640, the user, by depressing key 14 can select between a Morse code mode (box 642) and a close by long press mode (box 644).

The cane 12 or portion thereof is capable of vibrations and can vibrate in short or long vibrations that are achieved by short attenuation and restarting times controlling the length of the vibrations, that is relative short durations or long durations of vibrations. The latter effect makes the cane 12 a delivery medium for transmitting to the deafblind any received information in code. The combination of transmission and reception makes the eCane 12 also a communications device that is useful for such persons as deafblind individuals.

The programming used with the cane 12 can be divided into "universal," "personal," and "alarms". The "universal" program typically contains commands and/or requests that are appropriate for most persons, such as a cashier station at a store, a cashier at a train station, police station, elevator, public rest room, etc. The "personal" relates either to elements at a person's home, like a bedroom, a bathroom, entrance door, bed, etc. The "alarms" could have, as part of it, a sound detection system that has the ability to recognize sounds that pertain to the social environment translated to meanings we understand. Such messages can be translated to the deafblind by vibrations of the cane 12 or auxiliary parts attached to it. The vibrations can carry specific meanings, such as when encoded in Morse code. The programs used to carry out these functions contain all the software needed to activate and process cane activity and ancillary functions. It also may contain operational diagnostics and system messages that may be viewed either on an attached LCD, by hooking up the cane 12 to a PC monitor or by vibrations.

When a communication session takes place between a deafblind person and a hearing person, the cane 12 may utilize the following functions and parts. The deafblind person may select the communication mode, utilizing the action key 16 to activate the procedure shown in FIG. 4, and communicate by pressing the SEK key 18, in say Morse Code, to deliver a message. The code is translated into text which is then transformed into synthetic or other types of voice that the hearing person can hear coming out of a speaker 32 embedded in the cane 12. When such a session is established, the cane 12 can operate in one of two modes as shown in FIG. 3.

In the first mode, the cane 12 dials up, via a mobile phone (such as a cell phone) segment embedded in or connected to the cane, a preprogrammed number to a telephone relay service (TRS) 34, such as the interstate TRS services of a network or that of AT&T, Sprint, or MCI. Alternatively, the cane 12 dials a "711" number in the U.S. to access a local TRS provider. Once connected, the cane 12 may emit a canned message stored in the memory 17 to the calling assistant (CA) at the TRS. The message may state that this is a communication session of a deafblind person using the cane 12. Thereafter, Morse code may be entered by the user via key 14, which code is converted to text as shown in box 36. As shown in boxes 38 and 40, the CA can voice the text (box 38) to the hearing person or cause the text to be converted to speech (box 40). The verbal message from either box 38 or 40 may then be transmitted to the hearing person (box 42). Any voice message from the hearing and speaking person may be fed back through communication channel 54 to the eCane. The message may be transmitted to the cane 12 in the form of a code, such as Morse code.

The activation of an emergency "911" call may follow the same communication channel. The eCane user can press any two of the keys 14, 16, 18, and 20 to activate such a call. On such activation, the cane 12 establishes a TRS connection with a canned message delivery of an emergency call, which a trained CA will patch through or transmit to a 911 center.

Figure 3:
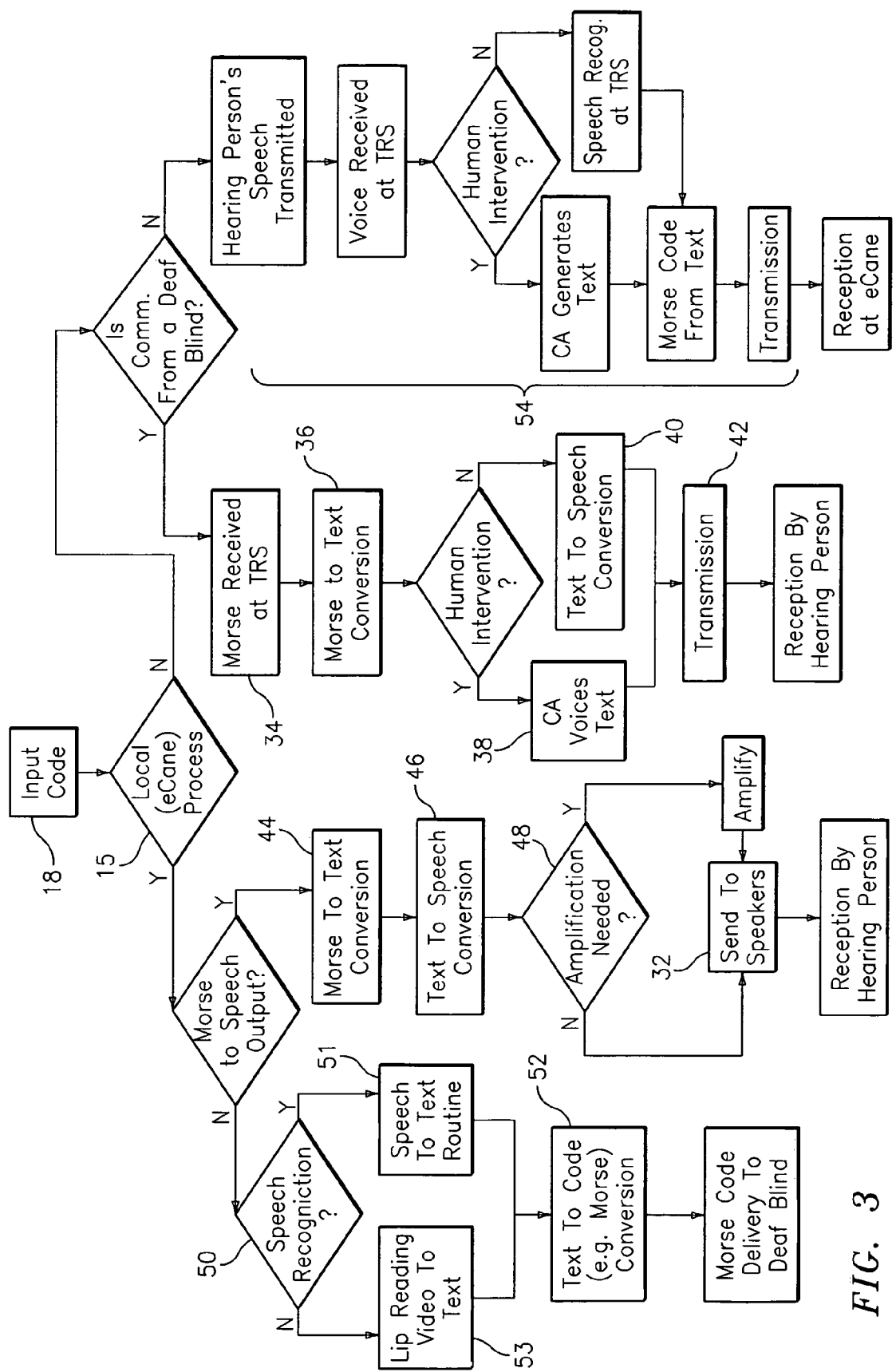
FIG. 3 is a flow diagram of a deafblind person communicating with a hearing person using the electronic cane of FIG. 1.

A second option for a deafblind user to communicate with a hearing user is shown on the left side of FIG. 3 starting with box 44. In this mode, there is no access to a TRS center. Instead, the cane 12 utilizes speech recognition technology to capture communications from the hearing person and text to speech technology to deliver verbal information to the hearing person. Alternatively, if the deafblind person or any of his/her accessories are provided with appropriate video camera equipment, then lip reading technology and/or sign language technology may be substituted for or added to the speech recognition. The processing segment for the deafblind user from Morse activation by pressing key 14 and back to Morse delivered via vibrations stays the same. As shown in box 44, inputted Morse code may be converted to text. The text is then converted to speech in box 46. If needed, the speech may be amplified in box 48. The speech may then be sent to one or more speakers 32 embedded in cane 12 for broadcasting to the hearing person. Oral communications from the hearing person may be picked up by microphone/receiver 33 in the cane 12. The oral communications may be picked up by speech recognition software 50 and converted back into Morse code for transmission via speech to text conversion (box 51) and text to code conversion (box 52). The conversion equipment may also include mans for converting lip reading video to text (box 13) back to the deafblind user.

This second option is particularly useful where, for example, a cane user just needs assistance such as asking someone to lead him or her by the hand to cross a street. In such a case, there is no need for the TRS involvement since the deafblind user can activate a canned message that the hearing person can hear off the speaker(s) 32 built into the cane 12.

It should be noted that the first and second options are not mutually exclusive for any embodiment of an eCane, and usage can be executed according to particular needs.

Under the first option, a user of the cane 12 can place a telephone call as well as be a recipient of a phone call. If the cane 12 is provided with a landline telephone in addition to the mobile phone apparatus the ability to connect to a wire (i.e. landline) telephone line exists, such as through an RJ-11, then a telephone call that is either landline or wireless can take place with the user of the cane 12. It should be noted that deafblind persons are able to communicate on the phone by wire utilizing a Braille reader unit. However, the Braille reader unit is not conducive when mobility is required. Alternatively, the cane 12 under the first option with its TRS communication via wireless technology is suitable for receiving and initiating wireless telephone calls from the cane 12.

When placing telephone calls, users do not pay for the access to a TRS center, but do pay for the long distance leg of the call. Some hearing individuals utilize bought "phone cards" that enable them to dial a long distance call from any telephone unit utilizing the prepaid card. To accord an appropriate functional equivalent form of such utility to a deafblind person utilizing an eCane one needs to view the eCane as the "Client" and the center processing the financial portion of the call as the "Server". The Client-Server relation contain algorithms to ascertain validity of the prepaid card, or its functional equivalent form, as well as ascertaining the integrity of data collected and non-tampered proper minutes of use. To this end we provide in Appendix III a Client-Server Authentication as an embodiment of such algorithm.

Figure 4:
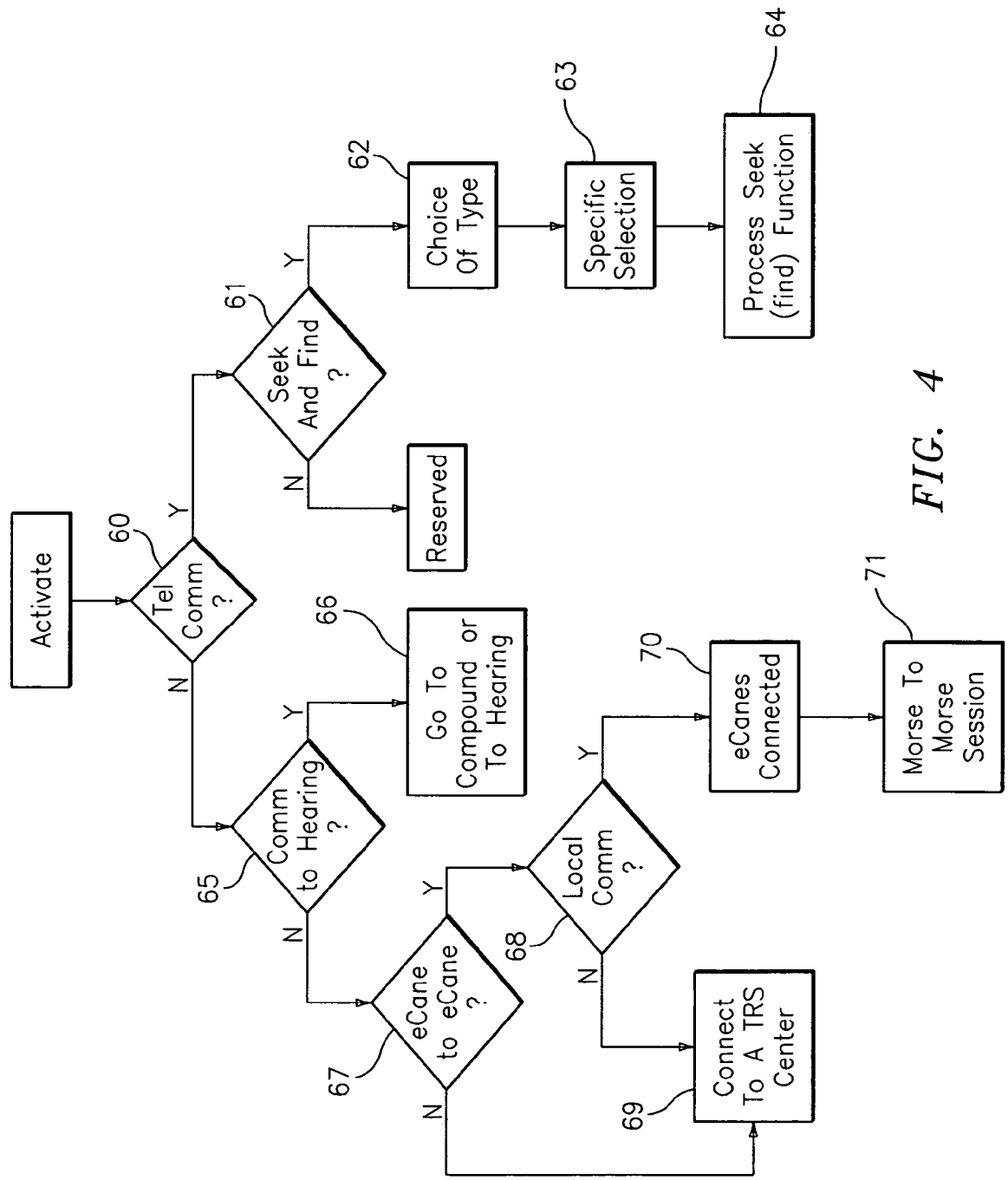
FIG. 4 is a flow diagram of a procedure for activating the electronic cane (eCane) of FIG. 1.

Referring now to FIG. 4, the cane 12 may be provided besides communication selection also with search and guide functions which emit messages (such as vibrations and/or pecking—referred to as nibbles—or symbols sensed on the user's palm) to the deafblind user guiding him or her through a universal guide vocabulary that contains movement and angle directions in the former and dynamic pattern sensed in the latter. Alternatively, the deafblind user can use a variation of the touch language described in the touch TV (tTV) section below as a navigational tool. Usage of an emergency vehicle alert companion described below and/or Doppler effect can be used by the cane 12 to determine direction of object motion where appropriate. Apart from, or in addition to, the directions provided via vibrations there is also the ability to deliver directions using touch language with a mechanical contraption that delivers the information to the palm of the hand.

The activities and processes of FIG. 4 are governed by the keys on the eCane 12, in particular, keys 14, 16, 18, and 20. The deafblind user activates the communication functions of box 60 that lead the eCane operation to box 65 by pressing key 20. If the deafblind user is not using the telephone communication (box 60), then the eCane 12 goes to the seek and find function of box 61. The eCane 12 responds with a question asking the deafblind user by code, such as a Morse code, delivered by vibration of the eCane 12 or an alternate optional "pecking" delivered to a body part, such as the palm by a protruding and receding small mechanical object that may be rod 11. If the eCane is being used by a blind person who can hear, then the question can be transmitted either by voice only or by both voice and "pecking". The actual question is "Seek?" and the deafblind user then either affirms or negates the question by pressing key 14 appropriately. A single press means "yes", pressing key 14 two times in succession means "no", and pressing it three times in succession is the equivalent to "backspace" command of a computer keyboard. If the deafblind user presses key 14 once, the eCane 12 accepts it as affirmative response and proceeds to position itself ready for next command of box 62. The eCane 12 may issue an optional appropriate "Ready" signal to the deafblind user that is transmitted by the coded vibration or pecking. The deafblind user then uses key 16 to signify his desire. If key 16 is pressed once, it will signify that the deafblind user is seeking a street name or building. Pressing key 16 twice will signify that the deafblind user is seeking something in the area of eating or food. There exists the option to use key 14 in conjunction with key 16, whereas key 14 is utilized to spell the word "Eat" for example by the proper signals of the Morse code. If for example, the deafblind user pressed twice the Action Key (AK) key 16, the eCane 12 now knows that the deafblind user is seeking something of the food type and therefore positions its program in the receiving mode of box 63 in order to proceed with the specific selection. The deafblind user then uses the eCane Selection Preference Key (SPK) 18 to choose the specific object of interest. In our example, since AK designated "Eat", if the deafblind user now presses key 18 four times, it will designate that the deafblind user is seeking a place to eat pizza. Alternatively, the deafblind user can use key 14 to spell the word "pizza" or if he can speak and the eCane contains voice recognition technology, then speak the word "pizza". The resulting effect is the moving of the eCane program to box 64, where a pizza place is being searched for and the deafblind user is guided to it utilizing the guide functions of the eCane 12. The guide functions are discussed hereinafter in conjunction with FIG. 6.

Going back to box 60, the deafblind user could have pressed key 14 twice indicating "no", where upon the eCane program would have not chosen to move to box 61 and then 62, but rather would have moved on to box 65. Depending on the hearing ability of the person with whom the deafblind user wishes to communicate, the software program may go to a text to speech mode (box 66) to allow communication with a hearing person or to an eCane to eCane mode (box 67) if the recipient of the communication is a non-hearing person. eCane to eCane communication may take place via box 68 over a telephone line (box 69) or a connection (box 70) between eCanes that allows a Morse to Morse session (box 71). The ensuing dialogue between the deafblind user and the eCane determines the course of action as shown in FIG. 4 and where the eCane poses a guiding question by a code (e.g. Morse) transmitted to the deafblind user by either vibrations or pecking and the deafblind user responds appropriately by either confirming or negating the question utilizing key 14 to transmit his answer.

In one embodiment of the present invention, the algorithm for search and guide utility may be based on a 16 Byte sequence as shown below: (the "0/1" is a toggle byte with either "0" or "1" position).

| Byte Number | 0/1 | Description |
|---|---|---|
| 1 | Yes | Outdoor/Indoor |
| 2 | Yes | This, left side/other, right side |
| 3 | Yes | Front/back |
| 4 | Yes | Up/Down |
| 5 | Yes | Clock direction |
| 6 | No | First Digit of Hour Direction |
| 7 | No | Second Digit of Hour Direction |
| 8 | No | First Digit of Number |
| 9 | No | Second Digit of Number |
| 10 | No | Third Digit of Number |
| 11 | No | First Digit of Type |
| 12 | No | Second Digit of Type |
| 13 | No | First Digit of Specific Type |
| 14 | No | Second Digit of Specific Type |
| 15 | | (Reserved) |
| 16 | | (Reserved). |

Thus, the Example 1 1 0 0 0 14 145 05 03 means indoor, the other side, in front of you, up, use hour directions where you are the center of clock and 12:00 is directly ahead, at 14:00 hours, room 145, type 05 which means a room, specific type 03 which means a conference room. In other words, the direction is walk ahead and up, on your right hand side at the 14:00 hour direction you will find the conference room. If the user overshoots the conference room, the third byte will turn to 1, and the sixth and seventh will become 10. On location, the cane 12 can optionally emit an alert vibration to that fact. Types and specifics are given in the appendix I attached hereto.

Environmental companions (EC) are auxiliaries to the cane 12 that enable it to do search and guide functions. They emit simple constant code received when intercepted by the cane, which code is translated to meaningful information vibrated to the user. The code emission can be either, powered by the EC units themselves or by a power passive echo returned to the eCane subsequent to a trigger transmitted from the eCane. In one embodiment, the EC units emit a code that is in a coded format of a barcode and, in another embodiment, the code may be a simple ASCII code of the alphanumeric characters identifying the object and its type. Such object could be the number of a room in a hotel or the word "elevator" in Braille next to the appropriate object. While mostly one can read room numbers or the word "elevator" in Braille next to the appropriate object, finding the object from a distance is a different matter altogether, and that is where the eCane 12 comes in as a useful guide both to the blind and the deafblind.

Figure 6:
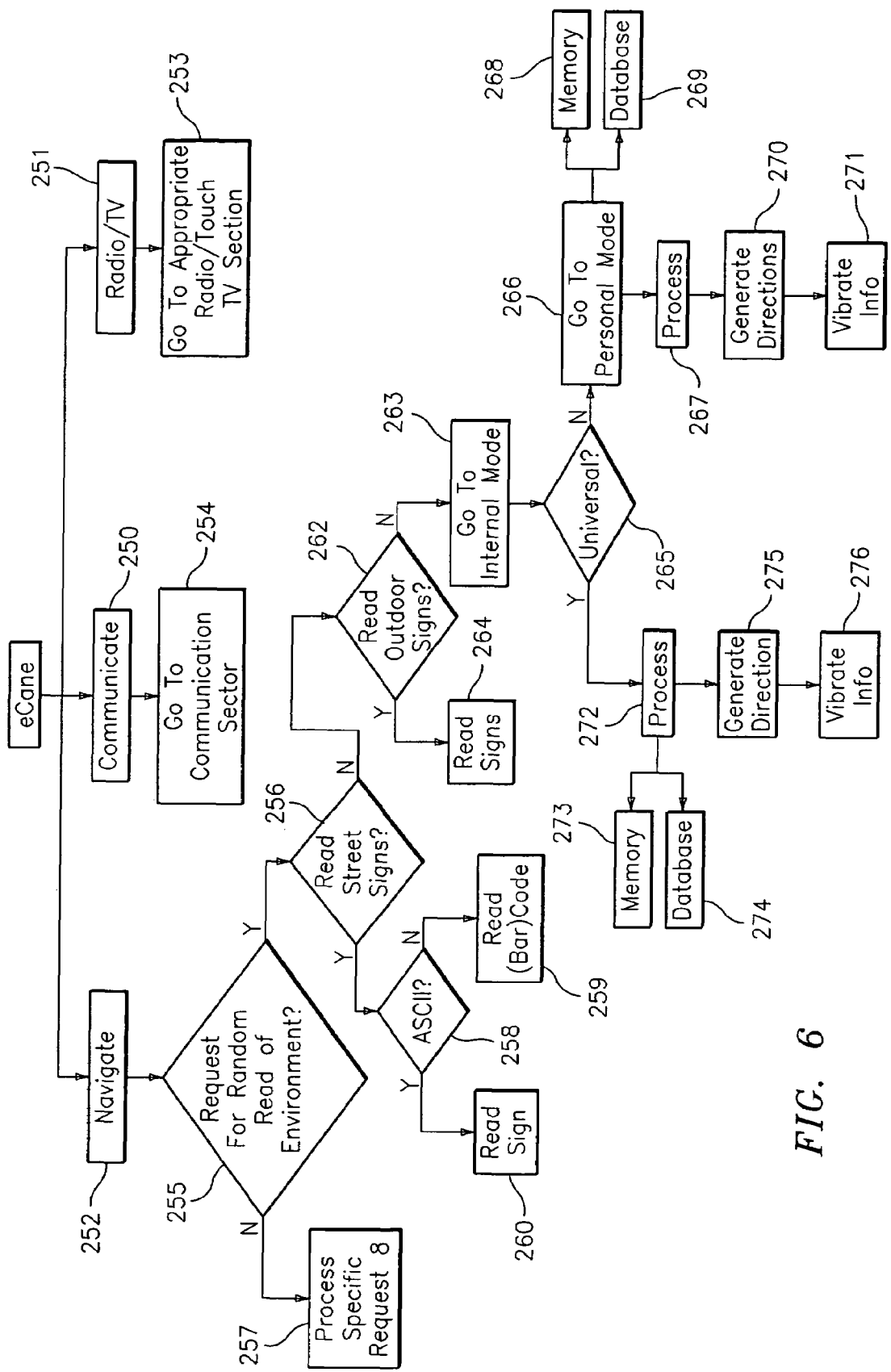
FIG. 6 is a flow diagram illustrating seek and guide functions.

FIG. 6 shows the eCane 12 using its navigation function (box 252) for such Seek and Find functions. Block 255 determines whether the eCane 12 delivers information to its user randomly as he or she advances with it, or responds, as shown in box 257, to a specific request, such as leading the way to the elevator. In the latter case, the deafblind user may select choice (4) in box 62 (FIG. 4) by responding affirmatively by pressing key 14 once when asked the question on the selection coming in wake of pressing the SPK key 18. The next step happens in boxes 63 and 64 where the specific item of "elevator" is requested. If however, the deafblind user desires to read a street sign, the software program in box 256 enables the user to determine in box 258 whether a bar code is read in box 259 or an ASCII street address is provided to the eCane by box 260. Guiding to various desired areas can be achieved in a variety of ways, some of which have already been mentioned before. As another example, the eCane may contain a directional antenna that rotates appropriately to determine the strongest signal direction (i.e., meaning the closest) and deliver the resulting analysis of strengths and/or cross sections, pin pointing to the eCane's holder a direction command. Such embedded directional antenna may be useful also in determining what side of the street is the eCane's holder positioned. It may also be part of the EVA discussed below. FIG. 6 also shows that the eCane 12 can go into an internal mode in box 263 via box 262 where either universal information (box 265) that is useful for the majority of people is processed in box 272 or in a personal or private mode of the eCane in box 267 where the information is meaningful only to the individual holder of the eCane 12. In both processing modes, a direction signal (box 270, 275) is generated and transmitted to the eCane user by vibrations (box 271, 276). Each processing mode may interact with a database (box 269, 274) and/or a memory (box 268, 273).

Figure 5:
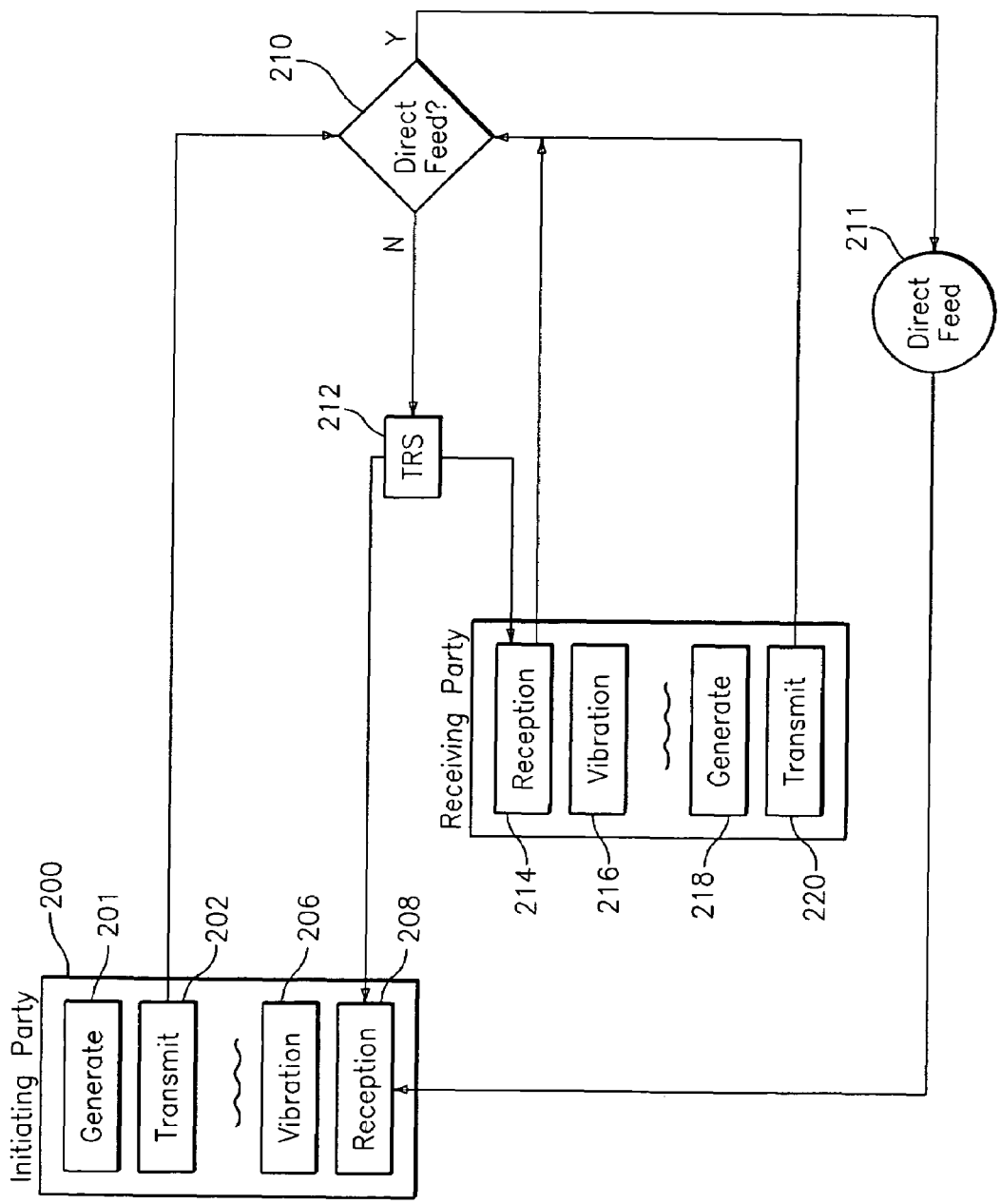
FIG. 5 is a flow diagram illustrating an eCane to eCane communication technique.
Figure 7:
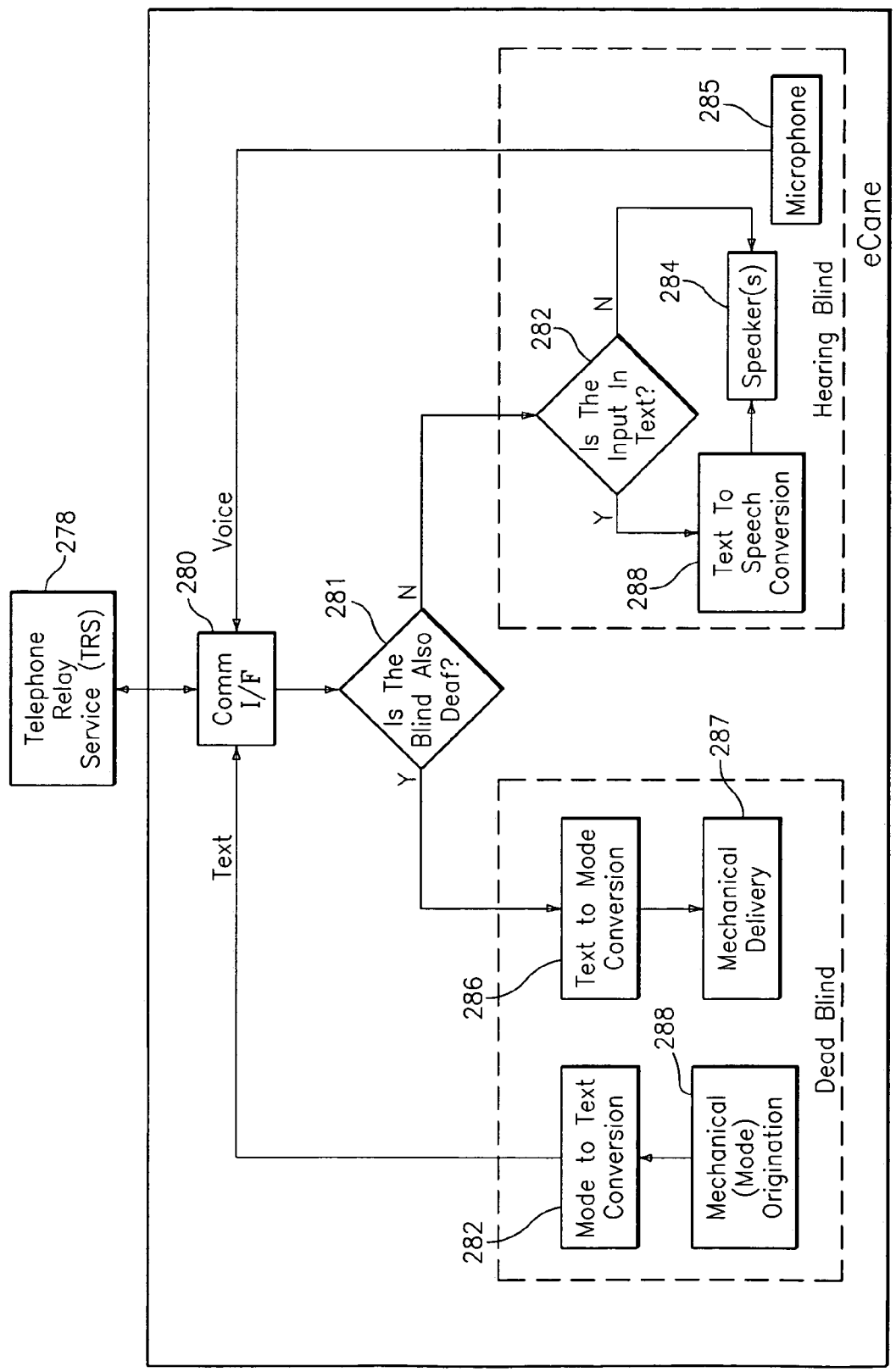
FIG. 7 is a flow diagram illustrating an eCane telephone process.

The eCane enables communications in the following ways: first and foremost communication between the deafblind user and the eCane 12 as shown in FIG. 1; then communication utilizing the TRS to communicate with hearing persons by phone as shown in FIG. 7 or with persons being physically next to them or to summon help in a 911 call; direct communications with a hearing person utilizing such aspects as canned messages, or communicating with another deafblind holding a counterpart eCane as shown in FIG. 5; and enabling safety and/or alert communications that may emanate from an EVA.

FIG. 5 shows an initiating party generating a communication in box 201, where the user answers affirmatively using key 14 to the vibrated prompt after pressing key 20 for communication. The connection is established when the initiating information is transmitted in box 202 to the other eCane . A direct feed to another eCane may be established in boxes 210 and 211. The information is transmitted directly to the reception mode (box 214) of the other eCane, which vibrates to appropriate information in box 216. Alternatively, the eCanes can communicate via a TRS as shown in box 212 when so determined in box 210. In such a case, the reception of the other eCane (box 214) is from the TRS and vibrations are generated (box 216). The response of the other eCane is generated (box 218) and transmitted to the originating eCane (box 220). The transmitted information is received by the initiating party's eCane (box 208) and converted into vibrations (box 206) to be received by the initiating party.

FIG. 7 shows an eCane telephone process. It hinges on active utilization of a TRS center in the traditional form of operation. It enables communications between deafblind persons with either hearing persons or blind persons that can hear. A hearing person's voice may be picked up by a microphone 285 and the text from the deafblind user may be inputted mechanically (box 288) and converted to text mode (box 282) and inputted to the communication center (278) via the communication interface (280). The Calling Assistant (CA) at the TRS 278 facilitates the communication at 280 being the interface point between the two participants. If the hearing impaired person is determined in 281 to be both deaf and blind then he or she receives the text from the CA using text to mode conversion 286, which is further translated to mechanical vibrations 287. The hearing person has two options of reception. Either text that is converted to speech (box 283) and heard from the speakers 284, or heard directly from the speakers 284 if the CA chooses to speak (box 282), rather than send text to the hearing blind person.

The cane 12 can also be used to send emergency information to the individual holding it. This aspect could also be extended via an independent device that alerts individuals in and out of a vehicle about such situations, as an approaching emergency vehicle or a train. When a person with a hearing disability is driving a car or crossing a street, fast moving emergency vehicles, like a police car, an ambulance or a fire engine can pose a danger. Such emergency vehicles use both an audible siren as well as a strong strobe of light. While one can hear the siren even if it is coming from a street perpendicular to where the person is, or if buildings obscure the street where the subject is, this is not the case with the strobe of light. Unlike sound, light travels in straight lines and would not be seen by a person in the perpendicular street. Thus, a person with a hearing disability may not hear the siren and may not see the strobe of light. In that regard, under such circumstances, the person is not only deaf but also functionally equivalent to a deafblind person. The Emergency Vehicle Alert (EVA) described herein overcomes the problem and enables such individuals to realize that an emergency car is heading their way. While inside a car, the alert is provided by a strobe of light that can either light up or be flashing. When out of a car, the EVA may be made of a moveable part which can either be carried as a hand held unit 292 or be in the car resting on its cradle 291 (see FIG. 8). The moveable part may produce vibrations or nibbles (i.e. pecking) as a form of alert.

Figure 14:
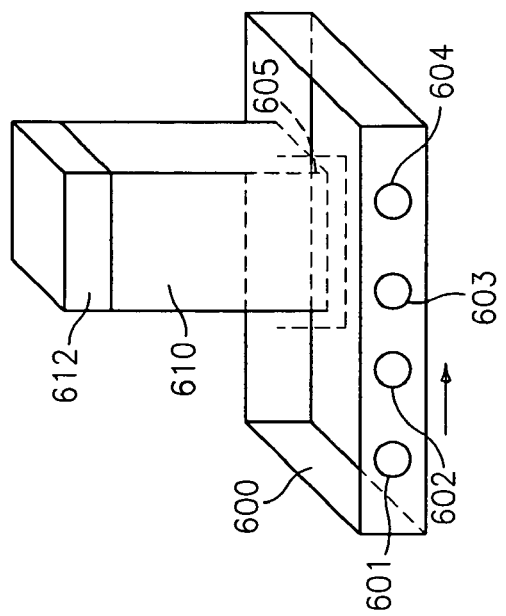
FIG. 14 illustrates an emergency vehicle alert system (EVA)

As shown in FIG. 14, the EVA 290 has a base 600, which has an indentation for a cradle 605, on which the portable part 610 rests when in a car. The base 600 stays in the car when a person leaves the car and removes the portable portion of the EVA 610, so that it can be used outside of the car. Upon returning to the car, the driver will be alerted by the base to place back the EVA 290 in its place in the cradle 605. An alert can be given, for example, by a strobe of light flashing at a different frequency than when there is an actual alert. Alternatively, the base may be equipped with a series of light emitting devices 601, 602, 603, and 604, such as light emitting diodes (LEDs) that emit timed light signals. That is, if the series contains n independent light sources, lined up in say, a straight line or a curve, then the first light source will come on briefly to be followed by the second light source as it is clicked off, and so on, until light source n-2 comes on, gets followed up by n-1 as soon as source n-2 is off, only to be followed again by the last light source n upon n-1 being closed down. The base 600 is shown with four such lights, where light 601 lights up first and as it is extinguished light 602 lights up only to be extinguished and be followed by light 603, and finally light 604 that lights up when light 603 has been extinguished. The sequence operates rapidly, and in succession, until the portable part 610 is placed in the cradle, which disconnects the flashing series.

The EVA operates by either recognizing the distinct sounds of an approaching emergency vehicle or by other means, such as an EVAC to be discussed shortly below. For a more sophisticated EVA, a Doppler calculation can also provide the speed of the approaching emergency vehicle or by utilizing an Environmental Companion (EC), such as an EVAC. The EC related to emergency vehicles, is a wave emitting signal device, such as a radio frequency (RF) emitter that is positioned in the emergency vehicle. It emits a code that when captured by the RF receiver of the EVA is recognized not only to be an emergency vehicle alert, but would also provide a code that will tell what kind of a vehicle is the one emitting the code. That is, an ambulance, a police car, a fire truck or even a train that though is not an emergency vehicle poses an emergency situation to a deaf person unable to hear its approach. Streets with EVACs, discussed below, containing street names also can provide the direction and speed of the approaching emergency vehicle. The EVACs 296 related to street addresses is a unit device attached to or next to a street nametag. It may also be a wave emitting device that emits information related to the name of the street and, where appropriate, also coordinates or other location identifiers useful for the EVA or other devices. Streets containing the counterpart segments to the independent EVA's or EVAs build into the eCane and referred to as EVACs are of various forms. They can be part of a building structure, a restaurant, FedEx, UPS or hotel front store to mention a few. They can also be on or next to such items as on street names tags. The basic EVA can also provide the distance for an approaching emergency car.

The optional counterpart to the EVA, which we refer to as the EVA Counterpart (EVAC) 296, has been introduced above. The EVAC 296 resides as a potentially standard issue in all emergency vehicles and trains. Upon activation of either a siren or light strobe, the EVAC 296 is activated as well. In case of "Silent Alarm" police procedure, the option can be either activated or deactivated by the emergency personnel in the police car.

Figure 15:
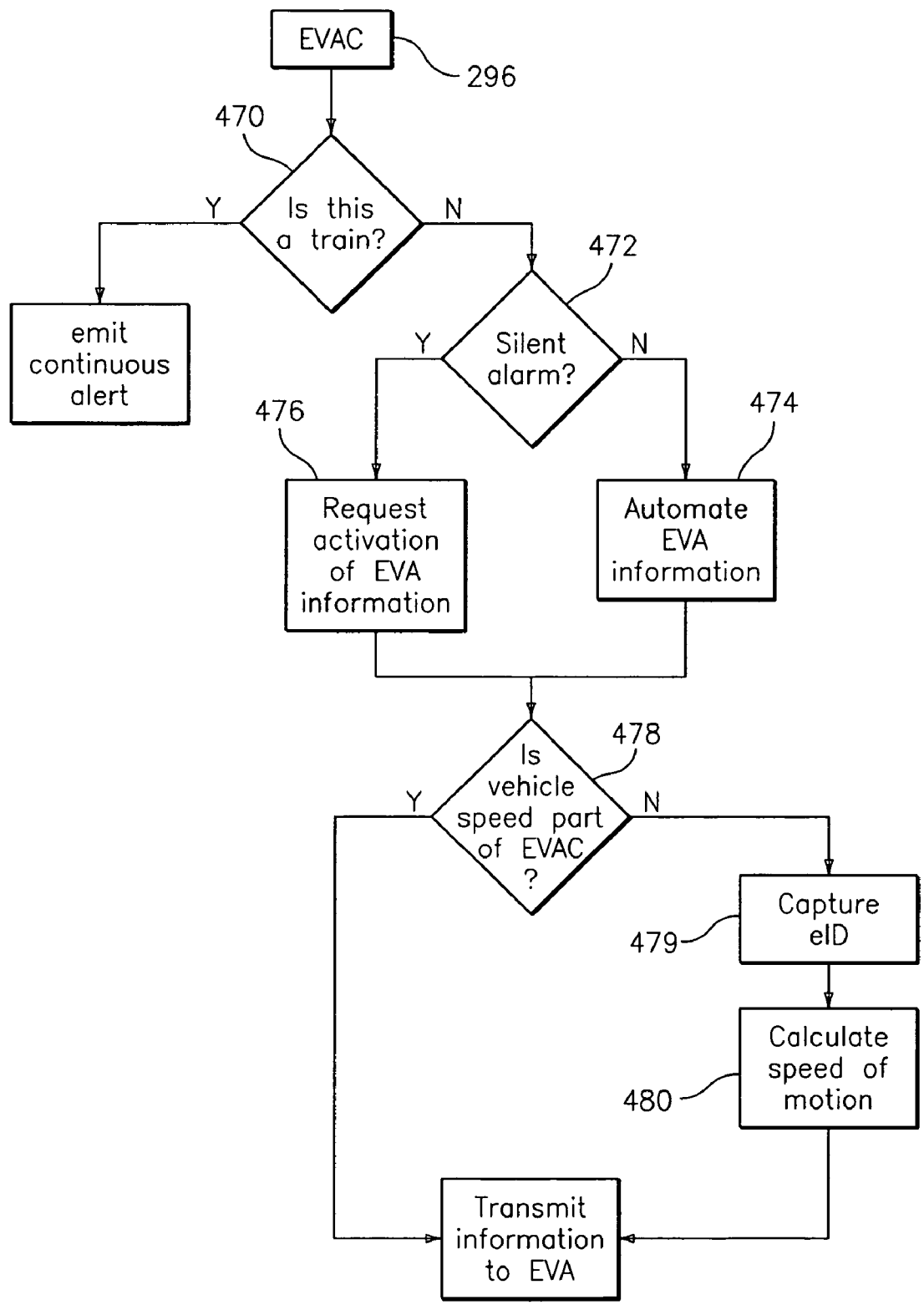
FIG. 15 illustrates an emergency vehicle alert companion (EVAC)

The EVAC 296 shown in FIG. 15 emits a signal, such as a radio Frequency (RF) signal, that is picked up by the EVA recipient. The EVAC 296 is coded for the particular vehicle type it represents, whether a train, or a particular emergency vehicle, such as an ambulance, fire truck or police car. As shown in FIG. 15, the EVAC first determines in box 470 the type of vehicle it represents before proceeding with its action. The EVAC next determines in box 472 if it is operating under a silent alarm condition such as that of a police car, where its automatic activation with a siren is attenuated. If it is a silent alarm situation, it requests in box 476 activation from the officers in the car, in order to accord the discretion to attenuate the EVAC function altogether under appropriate conditions. The EVAC checks next in box 478 to see if it contains specific information related to the car, such as the speed in which the car is moving. If the EVAC cannot transmit its speed information otherwise, then calculation of it is performed in box 480 after it captures in box 479 the emitted signals from the street nametags it passes. Alternatively the EVAC itself can receive wave signal such as an RF signal from the EVA, alerting the emergency vehicle's personnel to the fact that deaf drivers or pedestrians are on the road ahead of them.

Figure 16:
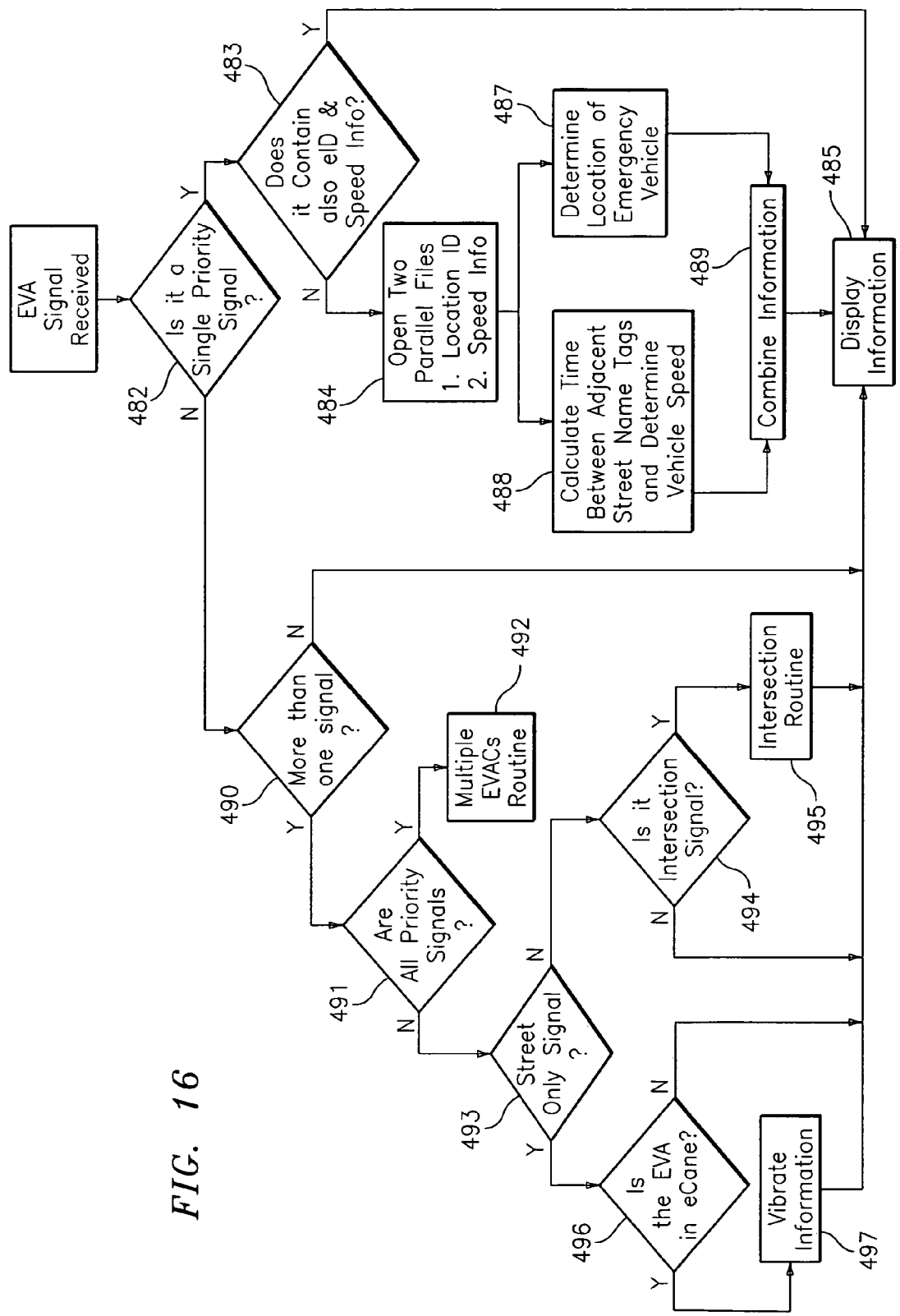
FIG. 16 is a schematic representation of how the emergency vehicle alert processes EVAC information.

FIG. 16 shows how the EVA processes the EVAC information it captures. The signal is first processed in box 482 in order to determine if it originated from an emergency vehicle. If an emergency vehicle emitted the signal, then it moves next in box 483 to check if additional information, such as speed of the emergency vehicle is also contained in the signal. If the checking results in an affirmative answer, then the message is sent to be displayed in box 485 either by light signal and/or by text. If it is determined in box 483 that additional information, such as speed is missing, the EVA opens two files in box 484, where one file contains the information received and one will be supplied with local calculations of the EVA as is done in box 488 while the location of the emergency vehicle is found in box 487. All segments of the information are combined in box 489 and displayed in box 485. If it is determined in box 482 that the signal is not a priority signal, the EVA checks in box 490 to see if there are multiple signals. If the signals are multiple, then the EVA checks in box 491 if they are all priority and if so then it moves to box 492 for the multiple EVACs routine. Otherwise, the EVA checks in box 493 if the signal is only a street nametag. If it turns affirmative, the EVA next checks in box 494 if the street signal relates to an intersection and if affirmative, it moves in box 495 to the intersection routine, otherwise it displays the information in box 485. If the EVA determined in box 493 that the information captured is more than just street names, it checks in box 496 if the EVA unit is part of an eCane 12 rather than a vehicle related EVA. If it turns to be part of an eCane 12, then the EVA proceeds in box 497 to match the type of the signal as is done in box 62 of FIG. 4. As we have seen, the speed can be determined in more than one way. It could be from the coupling of the EVAC in the emergency vehicle to the odometer, relating speed of movement for example by timing the speed of change of consecutive street-name-tags reported as shown above.

When the EVA captures the signal, it translates it into a visual message for the driver and/or passengers in the car, who may have a hearing impairment. Such a message can be as simple as telling about an approaching emergency vehicle, or it can be with details, such as the type of emergency vehicle, i.e. an ambulance or a police car. The EVA can capture emitted information, such as RF information transmitted in close proximity to the EVA, such as a street name on a post that is for utility of eCane users, or names of stores. These emitted wave identification (eID) units may be mounted on street nametags, restaurants and other stores that subscribe to posting it. Such capture of an eID by the EVAC can be either sent directly to the EVA, or translated first to coordinates and embedded as such at the EVAC then transmitting that additional information if appropriate. This allows the hearing impaired driver to realize the distance from the upcoming emergency vehicle, as it is transmitted into a visual message. Moreover, consecutive reception of radio transmission from successive eID units mounted on street "nametags" in conjunction with either the emergency vehicle speedometer at the EVAC or a clocking device measuring time at either the EVAC or EVA versus the speedometer reading at the EVA, enables calculation of the speed by which the emergency vehicle approaches the car with the deaf driver. Furthermore, utilizing the ability of the EVAC to determine what location the EVAC is, at any particular moment, can also add to the transmission and/or reception of information enabling the hearing impaired driver and passengers to know whether the emergency vehicle is right behind them, ahead of them, or at an angle, provided that either the EVAC and/or the EVA also capture the eID relevant to its proximity. The eID units are not limited only to street nametags (SNT), neither to the sole utility of deaf individuals. The eID units can be positioned in other places, such as on buildings, storefronts, trees, bathrooms, conference rooms in hotels, doors of rooms in hotels, postal service locations, bus and train stops, objects such as laptop computers, etc. The utility of these units resides in the eCane's ability to recognize the specific ID of the place and translate it to the eCane user. The usefulness of mounted eID units goes beyond the deafblind user and could be used by hearing and seeing persons needing to identify a specific place when for example they are in a moving car. It has other utilities as well, such as security usages that are discussed below.

In some embodiments, the EVAC can act as a security device known as the Security EVAC (SEVAC). The SEVAC has some additional functions and performance. For example, it can emit coded messages that can be received by a counterpart unit, such as the eCane, or a specially designed Security Alert Monitor (SAM). Usages may extend beyond the needs of deaf and deafblind persons and could be beneficial to hearing and seeing persons. The SEVAC can have such additional functions as:
  (a) Authentication of users and vehicles
  (b) Automatic activation with transmitted coded message
  (c) Emitting coded message (and possibly an audio alert in addition) that authentication code was not properly provided.
  (d) Conditional activation, that occurs only upon consent of car owner or a court order
  (e) Public authentication social signal Given below are some functions/embodiments of the SEVAC and SAM utility.
  (a) Authentication of users and vehicles. Authentication is important when a risk situation evolves and there is a need to verify whether, for example, the driver in the car is the legitimate user of the car. Furthermore, there are situations where there is a need to authenticate that the car is really what it appears to be. For example, a person can impersonate a police officer in his/her own car purporting it to be an unmarked police car. Another example is a person impersonating a police officer riding in a car disguised to look like a police car. Cases similar to the latter have been reported where the person impersonating a police officer tried to stop a car driven by a female for presumably criminal intent by the impersonator. Therefore, any police car that is equipped with a SEVAC will automatically transmit a code upon ignition trial and car usage will be rendered useless unless the legitimate officer who knows the appropriate code for that particular SEVAC deactivates it for successful ignition. Furthermore, the SEVAC in the last example can also emit a Public Authentication Social Signal (PASS). The PASS signal, such as in the last example, can be emitted only upon both car and police officer authentication. Double authentication can be done in variety of forms. The double authentication (car and officer) may be done twice—first time upon activating the vehicle, and second time when the PASS signal needs to be transmitted. Such security measures guarantee that a police car is not improperly appropriated while in operation and used for illicit PASS. Any vehicle (building, store, etc.) that is equipped with a Security Alert Monitor (SAM), or a variation of it, can receive (public) authentication of the legitimacy of the law-enforcing officer, who offers help or approaches the car/building, etc.
  (b) Authentication with consent (AWC). There are several occasions when it is important for law enforcing manpower, or other security personnel to authenticate the vehicles, their drivers, or to locate their whereabouts. Therefore, it is possible to locate a SEVAC of some form in, for example, every car manufactured or that is on the road. Any such SEVAC may transmit its signals continuously and uninterruptedly, whether the car is operating or not. However, the SAM is unable to receive and or record and/or decipher the authentication code unless it is a case of Authentication With Consent (AWC). Using a SAM for such AWC can only be done by law enforcing or security personnel, and even then, only upon satisfying the SAM that the code entered is the owner's code or a code produced subject to a court order. The former could be utilized for stolen cars, the latter when searching for a vehicle involved in criminal activity such as child abduction. The authorization can be achieved, as well as altered when needed, by a software algorithm that utilizes a personal-then-business five-digit-pin procedure.

In yet another embodiment of the SEVAC, it can be used for trucks hauling for example, food, or propane gas where checks of driver and/or vehicle authenticity may be of value when done randomly or upon needed occasion. For example, random checks done for security purposes by a trucking company could be a major deterrent, or assistance in preventing or foiling truck hijacking and/or a terrorist who plans to sabotage food channels or explode a propane gas truck in a congested human neighborhood.

Another embodiment of the pair EVA and EVAC or a similar construct could be useful in providing an alarm to individuals and/or groups regarding various situations, such as a fire alarm or a burglar alarm for deaf persons.

A fire alarm may be constructed that activates a portable unit which either emits a strobe of light and/or vibrates when activated, thus alerting a person with hearing disability about a fire. However, when a person with a hearing disability is in one location of a building, or inside a room in a hotel, and fire breaks out in another part of the building or the hallway, it poses other safety and/or security problems. For one, if the portable fire alarm is activated by sound, it may be out of range or masked by heavy doors. In addition, it is important for a person with a hearing disability to ascertain in what direction to escape. Such safety/security elements are solved with the EVA/EVAC pair where a number of combinations can occur. For example, fire alarms can be equipped with units of EVAC carrying appropriate designation ID (i.e., Fire), transmitted by for example, radio frequency signals to the EVA. Furthermore, as the EVA is useful in determining where an emergency vehicle is coming from, so can the fire alarm under discussion point to the direction of the fire.

While a fire alarm is essential for physical security in case of fire, a burglar alarm could be essential for the mental calm of persons with hearing disability. They might be able to feel the heat generated by fire or smell the smoke even if they are with a hearing disability, but they cannot typically hear an intruder breaking into the house even if noise is generated. Living with such constant fear or anxiety can be avoided with either an EVA/EVAC embodiment or a SEVAC/SAM embodiment that utilizes some form of break-in alert for windows and doors, etc. The break-in alert can be any device or contraption known in the art, such as an Infra Red (IR) beam that triggers the alarm when the beam is interrupted.

There is a need to ID products and items for inventory, which is typically done utilizing bar codes. However, there is a need that goes beyond simple inventory—a need that can help in automating verification of existing inventory as well as locating missing inventory items, such as for example laptop computers, military firearms, or ingredients for building weapons of destruction. Thus, another use of the EVA/EVAC or the SEVAC/SAM is for the purposes discussed here. The barcode can be located on a small integrated circuit and the present invention can help in automating registry of the existing inventory. Moreover, if a SEVAC is located in a laptop it can transmit its ID number to an appropriate SAM, providing data regarding its whereabouts, for example, upon activation of an Internet access or just being in the monitoring range of a SAM. For other items, where Internet is not appropriate or available, other possibilities exist, such as information gathering techniques that utilize radio messages when passing through a Signal Collection Depots (SCD) area. Additional details for safeguarding laptops are provided in Appendix III.

There are situations when a person in a vehicle needs help, either medical or against hostile pursuing person(s) in another vehicle. A hearing person can hear that somebody is close and ask or shout for help, and answer some questions in return. A person with hearing or speech disabilities is denied such help potential. The present invention can help such persons with hearing or speech disabilities, as well as persons without disabilities. In a particular embodiment of a SEVAC, it carries the ability to summon help for either one of the cases discussed in this section. The principle follows when applicable, that of the eCane's deaf to hearing communication. There are two emergency keys on the SEVAC, though they can be combined into a single key. One key is for summoning medical emergency help, the other for summoning police, good-Samaritan or "guardian angel" type help. There is also the possibility of automating such activity and even include a short description of the problem, for example, as one of several canned messages. In such embodiment, the SEVAC reads local signs information and transmits such information to the special SAM used at police vehicle and police stations as described below. As the transmitting vehicle moves and changes location so does the transmitted information. The latter upgrades the material received in police or other designated vehicles or in Signal Collection Depots (SCD) that are posted in designated locations along roads, etc. Such SCDs are independent units that can receive transmission from any activated SEVAC and transmit it to a centralized location, such as a police department with a centralized SAM that can accept multiple transmissions from independent SCDs. The SCD can operate independently, in conjunction with, or based on such technology as cellular technology. The SEVAC can also utilize for this embodiment the combination of a stationary cradle and a removable part that can be taken with the person exiting and leaving the vehicle. In such an embodiment, the cradle will continue to transmit its latest location information with the added information that the removable part has been disengaged. Such activation causes a dual transmission. Namely, one transmission comes from the cradle in the stationary vehicle providing last sign ID and in addition readings from the portable SEVAC unit with the person maintaining a dynamic update on location changes.

The SAM in this embodiment has two segments. One segment is a vehicle segment, such as a police or designated vehicle, and another segment is a centralized unit at a dispatch location. The mobilized unit has four functions.

First function is to receive transmitted emergency information from a cradle of a SEVAC.

The second function is to receive transmitted information from the portable unit of the SEVAC.

The third function is to receive transmitted information form any SCD monitoring the SEVAC. Obviously at all times, various elements of ID are transmitted together with the location information.

The fourth function of the mobilized SAM unit is to transmit received information from its three functions to the centralized location.

The centralized SAM at a dispatch location has multiple tasking and multiprocessing capabilities. It receives and transmits information related to all SEVAC units activated in vehicles as follows.

(A) Received Transmission
  (i) From SAM units in police or other designated vehicles
  (ii) From SCD units that pick up transmission from activated SEVAC (cradle and portable units)
(B) Information Transmitted
  (i) To SAM units in all relevant police, emergency or designated vehicles, or any other SAM units that need to receive such transmitted information An example of an algorithm for requesting help is as follows:

Preliminary
  Two components are at work
    SEVAC Component Plus SAM/SCD Component
  S(k)=Permanent ID of a SEVAC (user k registered ID)
  D(f)=Permanent ID code of a SCD
  a(j)=Selected canned messages
  i=index & counter
  b(i)=EVAC information; b(0)=0
  A(i)=[S(K)+a(j)+b(i)]
  A(0)=[S(k)+a(j)+b(0)]=[S(k)+a(j)]
SEVAC Component
  (1) Help key is activated [i=0; A(0)=S(k)+a(j)+b(0)]
  (2) EVAC (e.g., SNT, NT) information is captured and processed
  (3) System index counter is upgraded [i=i30 1]
  (4) SEVAC emits the canned message [A(1)=S(k)+a(j)+b(1)]
  (5) Stop if so instructed, otherwise go to (2) and repeat sequence
SAM/SCD Component
  (1) SAM captures code A(i) and transmits same if relevant
  (2) SCD captures code A(i)
  (3) SCD transmits code A(i) as C(i)=D(f)+A(i)
  Centralized SAM captures the code C(i)

Certain embodiments or partial functions of the eCane are useful as assistive devices to persons who not necessarily are either deaf or blind. As an example, we articulate below one case of general disability of aging persons who are confined most of the time to a nursing home, and the other case of persons afflicted with the debilitating Alzheimer disease. The eCane 12 in such an embodiment is an assistive device with the function of assisting persons with environmental orientation. The device can also provide as feedback information regarding the ID of the person when the personal information related to the person is either embedded in the eCane 12 or a code on it can be matched with a database of personal information against the ID number. Furthermore, the eCane 12 either has a permanent thumb imprint (i.e., physical or voice signature) of the person and/or such imprint exists in the appropriate database mentioned before. The device can have other uses, such as assistance in locating a missing child, or locating missing household pets when a small size SEVAC is worn by them. However, the main interest here is to assist in human disability.

An Alzheimer person, who does not know where he or she is at a particular moment in time, can activate the device to find out their whereabouts. If they forget that they can find their whereabouts with the device, they can be rendered help when somebody else activates the device for them from a remote location and obtains the needed information. Remote activation can be achieved for example by using an embedded mobile phone apparatus in the eCane that is triggered by a coded signal sent to it. Yet another example is by triggering the action through a signal sent from a centralized SCD that activates such signal sending by all SAMs that are in its range.

Thereupon, the Alzheimer person can be reassured through voice transmitted to him or her from the device, and at any rate somebody can go and fetch the person. Thus there are two activation functions to the device, local and remote.

There is more than one function in remote activation:
  One can "ping" the device from a remote location and find the whereabouts of the device (i.e., the person wearing it), by utilizing the environmental companions in the vicinity of the device, whether they are SNT or any other NT; or
  One can combine some verbal material with the remote activation, be it soothing or comforting voice, or matter of fact information. The latter can be accomplished with text to speech technology generated upon text transmitted to it, or by using other methods, such as mobile phone technology. In either case, real time messages can be transmitted either by impromptu message or through a selection from a list of canned messages.

Aging persons may find it difficult to orient themselves in a nursing home environment and may require personnel assistance in orientation and guidance to locations. The device can be used in two distinct ways, where the activity is either generated by the user, or by another party, such as nursing home personnel as follows:
  the user can be summoned, via either an eCane embodiment or a partial segments of it that could be worn by the patient, to come to his/her room or to a particular location in the nursing home, such as the dining hall or the infirmary; or
  the user activates the functionality of the device in order to find his or her room, somebody else's room, or another-location such as a cafeteria or the nurse station.

The device can be equipped with a speaker where the guidance and assistance can be provided verbally to the person either by canned messages, or by voice (human or artificial) response to the need. The particular location, such as the nursing home, will need to accommodate environmental companions of NT to assist in localizing the individual position of the person and then provide the needed guidance.

Figure 8:
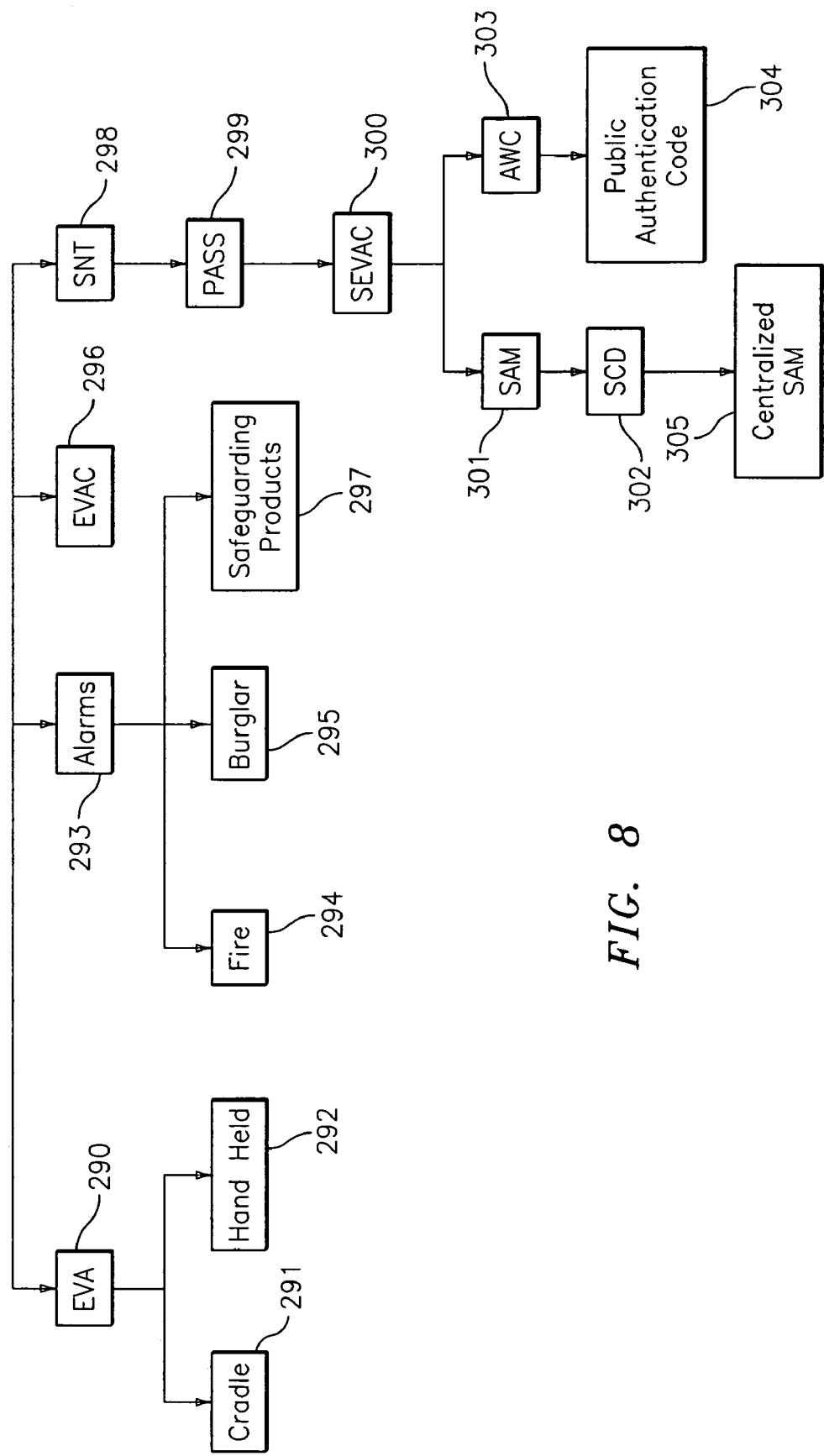
FIG. 8 is a schematic diagram showing various alerts, which can be received by a deafblind person.

FIG. 8 illustrates the EVA and its utility for generating alarms 293. The alarm can be a fire alarm 294, a burglar alarm 295 for a burglar who enters the premise without the deaf hearing anything, or an alarm 297 sounding when the safeguarding of products has been breached. Information may be fed to the EVA from the EVA Companions 296. Various data generating, collecting and transmitting auxiliaries such as SNT 298, PASS 299 and SEVAC 300 with its SAM 301 and SCD 302 are also shown. Utility of SEVAC segments requiring consent are shown in AWC 303 with the public authentication code 304.

Figure 17:
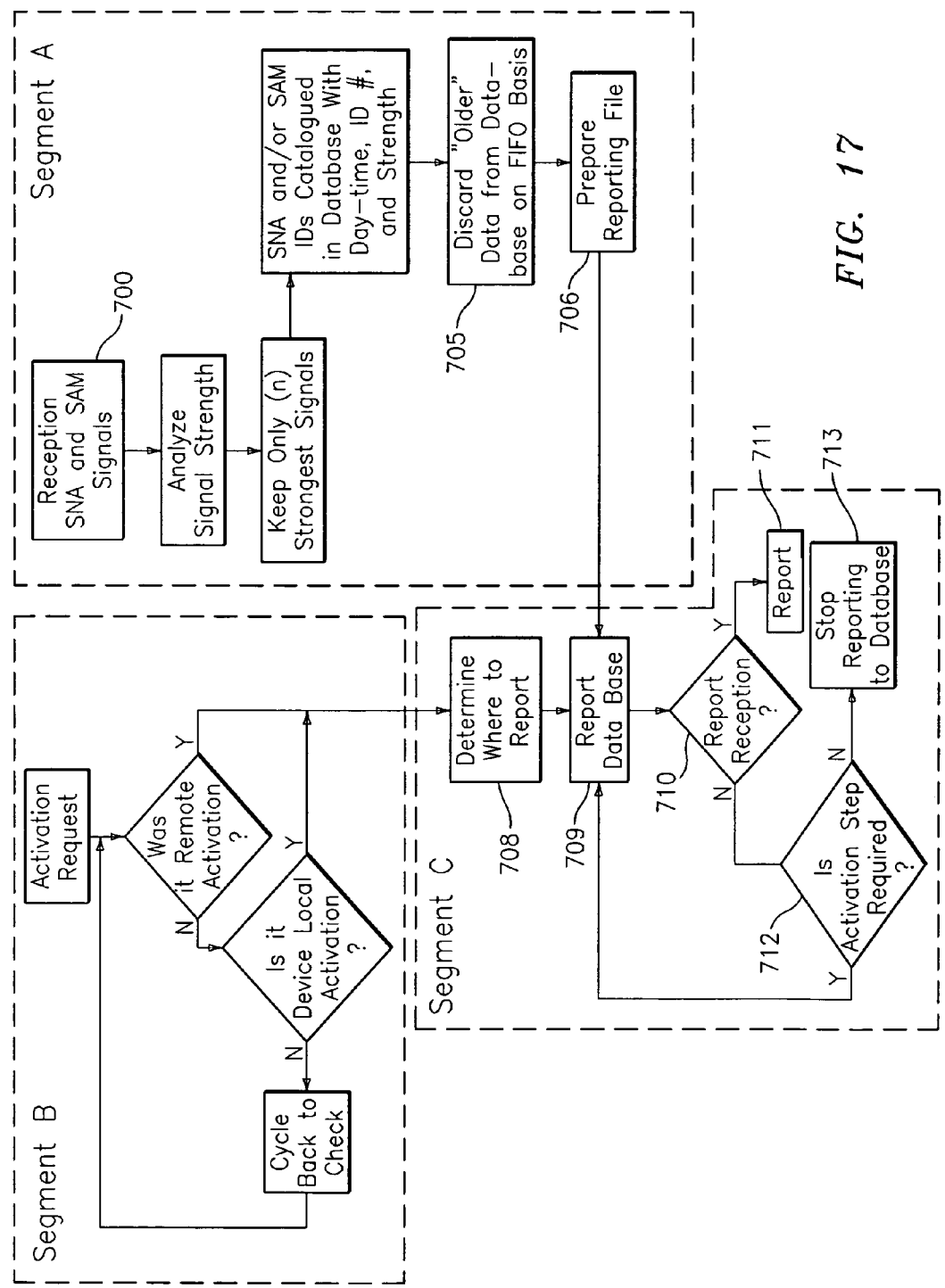
FIG. 17 is a schematic representation of a system for locating a person.

There are elements of the technology that are relevant and useful to the general population, such as in utilization of a 911 call, which is discussed next. The present invention enables tracking down the location of a wireless 911 calling person, irrespective of the Global Positioning Satellite's ability to report on a caller's location. The process makes use of SNA and SAM position reporting similar to the SEVAC operation. The procedure embodies the following segments. As shown in FIG. 17, three independent segments may be used. Segment A receives and updates, continuously local to the device, position signals obtained from SNA and SAM units. Segment B checks continuously if any request has been made either locally by a user or by a remote request to send the information processed in segment A. Segment C sends the requested information and checks to see whether to send a new file with information from Segment A that keeps updating its files second by second. Specifically, the operation is as follows:

Continuous Monitoring & Logging
  The Embedded/ad-on technology is part of the wireless phone structure and operation
  The unit monitors in box 700 (FIG. 17) all SNA and SAM segments operational in its vicinity and relevant to it.
911 Package Updates
  All relevant SNA and SAM segments are updated in box 705 (FIG. 17) into the 911 package on a second by second time segments
  The 911 package is an updated segment that is concatenated in box 706 to the 911 delivery segment
Voice/Text Confirmation
  An optional confirmation is provided if requested in box 710 once the 911 call was received as result of box 708 and the updated segment logged in either voice and/or text providing the caller with a modicum of assurance is provided in box 711
Bi-directional Voice/Text Assistance [while updates continue]
  Added modicum of comfort to the user placing the 911 call can optionally be provided through usage of the wireless phone, either by voice and/or text. Either unidirectional information is provided to the wireless phone, via human or canned pre-prepared messages, or bi-directional communication is established between the phone user and the 911 centers.

The wireless package transmitted contains universal and potentially personal segments. The personal segment requires registration of personal information related to the user of the wireless unit, which can be accomplished in a variety of ways, such as at point of purchase, connecting to a designated web site, or by calling a designated phone number from the phone unit and follow the prompts. The universal segment contains date, time, last SNA and last SAM information (and preferably the last two different SNA and SAM logs available in the system. The SNA information logged includes indoors information as well, enabling positioning the party at a particular location, be it a room in a hotel, a bathroom, a hallway, etc.

The eCane 12 can be used to enable blind and deafblind persons to partake in social games and sports. Static social games, such as cards, monopoly and chess, could be played by deafblind persons once the parts composing the games have the proper electronic segments comprising an embodiment of an environmental companion (EC). Video games, including flight simulation, could be played using eCane technology, which enables proper handling of the tasks.

There are three categories of such games and sports:
(i) Those utilizing only an appropriate embodiment of an eCane technology, such as:
  Running (including a marathon), where:
    The deafblind is wearing the eCane embodiment that enables orientation, direction, and proximity to objects and persons (see also Touch technology below)
  Ice skating, where Similar embodiment of eCane for running is exercised
(ii) Those utilizing an auxiliary part for the activity, such as:
  Ball
    Where the ball contains an appropriate EC transmitting and/or echoing communication with the eCane embodiment that can be worn on the body
(iii) Those utilizing both categories (i) and (ii), such as:
  Ice hockey, where the puck is the EC and the handle is an eCane embodiment
  Golf, where the ball contains the EC and the golf handle is an eCane embodiment The present invention enables deafblind persons to communicate with hearing persons, finding their way to specific locations, such as a particular street, restaurant, store, bus stop, etc. The communication with hearing persons can take place outdoors or indoors. Another extension of indoor communication for the deafblind has to do with the ability to enjoy radio and TV. Radio broadcast like news can be transmitted to the deafblind operating a Braille reader, which is not portable. Radio broadcasting can also be perceived by deafblind utilizing the eCane 12 in the same manner as when picking up speech from a hearing person. That is, the eCane 12 can function as a functionally equivalent hand held radio, though significant memory buffering is required to enable synchronicity with the deciphering skills of the deafblind. However, TV shows are different than radio broadcast, as they relate to utilizing two of the human senses, hearing and vision. The deafblind cannot hear and cannot see. Therefore, a deafblind who wants to enjoy a TV show has to rely on a Braille reader or the eCane for voice reception unless the invention discussed below is utilized. This segment of the invention presents the ability of the deafblind to enjoy both radio and TV.

To enjoy the radio, reception of voice occurs in the same way the deafblind receives speech content from a hearing person as has already been discussed before. However, for radio reception the present embodiment of the eCane has an addition in the form of a buffer that holds in memory the text received by the eCane from the CA at the TRS, from the speech recognition element of the eCane, or from another source. The text is released from the buffer to the vibrating cane (or any other vibrating element, pecking, pulsating element or Braille reader) at the speed that is commensurate with the ability of the deafblind reception capability. The buffer is a memory set that maintains the text in it until released. The buffer also dumps the content into a semi-permanent or permanent storage memory, so that the deafblind can retrieve it later and receive news or other items later for the first time or receiving it again.

As mentioned before, enjoying TV relies on two of the human senses, hearing (words and sounds) and vision. A deafblind person who would like to enjoy TV can use the present invention described hereto to satisfy the functional equivalence of hearing, but cannot satisfy any functional equivalence of vision except a description in words of various scenes. Therefore, the present invention is extended to satisfy other senses for the deafblind. True enough, it cannot be vision, but the present invention is first extended to utilizing the sense of smell when in receipt of TV broadcast, as is presented below.

This embodiment of the invention enables a deafblind person to be aware of various odors that are emitted in conjunction with a TV airing at a particular time. The invention is not limited just for deafblind persons. While the TV with Triggered Odor Emission (TOE) has been invented for the benefit of deafblind persons, it can also be utilized to enhance pleasure of hearing and/or seeing persons when using the TV, by adding the dimension of a third sense to the total perceptions from TV reception, the sense of smell.

The invention in one embodiment has various chemicals either in bins or pasted on a removable surface as substrates. Each one of the chemicals can either by itself or in combination with others, emit a particular odor when heated. Heat applied to the chemicals is one way to release the odor, passing small current through the chemicals is another way producing similar results. The chemical chosen starts to evaporate and the (measured) vapors are released into a cavity from where it is funneled outside (such as by utilizing a fan) so that the TV audience can smell it. The application of heat can be either by ambient, convection, electrical current, or radiation. The odor emission effect can be either instantaneous to the heat application or timed so that heat application could be generated to coincide with a particular odor emission. There is also a secondary bin/bins or removable surface with substrate/substrates of negation or extinguisher chemicals that overpower the emitted odor and eliminate it from the surrounding, referred here as the neutralizers. Neutralizers can also be affected by other means, not necessarily chemicals. For chemicals one could use organic substances that comes from the aromatic ester family to produce desired odors. The odor generated by the chemicals spreads through the migration of the chemical particles in the air or is enhanced by application of fan(s). Furthermore, in the same way that one can position loudspeakers in various locations in a room to enhance sound effects, so can one position in the room contraptions with chemicals and their controls. Control effect can be accomplished either by wire, or wireless means, and is generated either directly by the broadcast, or from a local control. One can also have a private per-user-contraption (like earphones in the case of sound) allowing TOE only at the immediate local environment of the user.

A TV program taking benefit of the invention will be able to emit odors appropriate to various scenes. Scenes of explosion will trigger an odor of sulfur peculiar to explosion, fire in the scene will be conjoined by appropriate odor of fire and ash, or area with flowers could cause for odor of flowers to be emitted, yet the appearance of a woman on the TV screen, wearing pleasant perfume of one kind or another will cause the emission of the same equivalent perfume by the TOE. Furthermore, commercials of food or cleaning material for examples could be enhanced with the appropriate odor related in such cases. Neutralizers are also extended to "mute" situations where user's choice can determine if any or all of the odor mechanism should be disabled at any desired moment.

The chemical bins or substrate deposits can either be semi-permanent and be replaced only when it is exhausted, or contain chemical deposits good for a period of time only, such as a month or a week and change the compositions as is anticipated to be appropriate for the shows to be broadcast during that period. Persons would either buy or subscribe to such periodic replaceable chemicals, which could be easily inserted or removed from the (for example TV) host. The algorithm of odor release is event triggered and the appropriate code is sent to the TV, the units around the room, or both. The algorithm pinpoints the odor release according to a specific prescribed event. Namely, by date, day, time, channel, code verifier, event, trigger time, duration of signal, etc. The broadcast of signal that pertains to what to deliver, when and at what juncture is either sent via a TV broadcast, such as in a digital TV, A coded text activator via close captioning or by utilizing an Internet site that provides such trigger clues, to name some examples. The delivery system functions can include the ability to increase or decrease odor emission, or "muting" by extinguishing a single or more odors.

Thus, this invention enables a deafblind person to utilize the sense of touch for functional equivalence of speech or descriptive text via eCane functions, and utilize the sense of smell as a functional equivalent addition to missing vision in a TV broadcast.

Another potential usage of the TOE could be in creative self-expression that could enable deafblind to substitute painting and drawing with compositions of odors of various intensity and combinations for either static or dynamic expositions. Any person who is skilled in the art can build an apparatus that would trigger such activities as described above, including either a fixed or moveable contraption enabling human nose to perceive the experience.

In another embodiment the odor generated by the chemicals does not have to be related to a TV broadcast and can be utilized to create desired smells in a particular environment of a movie theater, office or home to name some examples. The odor release mechanism can also be made to work with certain radio transmissions, Internet material content, CD-ROM material content, etc., where embedded signal trigger odor events.

In another embodiment one could introduce another sense, the sense of taste, closely replicating via use of chemicals the sense of smell. The functional equivalent TV can operate with either one or both of the senses (smell and taste), as provided herein.

Namely, the TV user can smell on his/her own, but when it comes to a sense of taste auxiliaries are needed. Thus, a user can hold an object in the mouth that upon receipt of appropriate code will cause a particular taste bud to be triggered in a non-toxic manner. For example, a taste of metal when say, a vehicle or airplane is involved in a crash and one needs to impact the sense of metals. Likewise, other tastes can impact perceptions that may be appropriate for scenes on TV and thereby assist or enhance the interaction of the user with the TV broadcast.

Referring now to FIGS. 9-13, the sense of touch can be utilized as well, and is quite useful for TV reception. In such a touch TV system (tTV), an area of the body is in contact with a special contraption, such as a pad. Such a contraption can emit small currents, vibrations, heat, or mechanical impact all directed to the body part that makes connection with it. In one embodiment such a body part is the palm 500 of the hand of a person that is placed on the contraption, and possibly the palm of the hand with the extended fingers 502 of the hand (without the thumb for reception purposes). The extended fingers 502 may be utilized for various specific symbolism related to the delivered message, instead of or in addition to the thumb if warranted. To take full advantage of such a contraption, a procedure that corresponds to visual effects is developed, and for convenience is given the name of touch language. For an embodiment using the palm, it is also proposed to use the back 504 of the hand as necessary. The rationale and utilization of elements of Touch Language are provided below.

It should be noted, that there are intended to be various sizes of Palm Impression Touch Language deliveries. The sizes of the units correspond from rather small palm size, such as children, to very large size corresponding to a large palm.

The impressions on the palm can be obtained in numerous ways. For example, in one embodiment one can use continuous stylus (not shown) to create the sensation of a moving object, while in another embodiment such effect can be produced by successive impacts of small units that come in touch with the palm in different location and create the impression of a movement. In the Continuous Stylus embodiment, n by n styluses may be arranged in a matrix (e.g., n=3), depending on the radius of the stylus and PalmScreen size impact dimensions. The need for n>3 is due to such attributes as "expansion", "explosive", or "implosion", that appear in touch language as a sensation on the palm of a ring that either expands (for explosion) or contracts (for implosion). Such attributes therefore, require movement changes in the radius of the ring. That is, create the impression of a ring and/or a disc. Each stylus, starts its function by emerging upward (or downward) towards the palm (or the back of the hand), moves freely in all directions with any straight or curved line, and finishes its task by returning downward (upward) to its cradle.

The dialogue segment enables the viewers to follow dialogue segments among communicating parties in the show. Such mechanical segment can have various embodiments. We discuss below one such embodiment that enables rapid reading in Braille of dialogue segments appearing during the show. We also revisit that segment of the apparatus when we present below the dual hand touch TV apparatus. The mechanical apparatus is either a single bar that has its two end points tilted at an angle, or disjoint parts providing same effect. Namely, the tips of the eight fingers (i.e., both hands without the thumbs) rest on a specialized Braille keyboard or pad 520 that enabling to read the captioned dialogue text in Braille. Reading Braille in that fashion is achieved by any technology that comprises prior or current state of the art at the time, such as is used by deafblind persons to read text output from a computer. The edges 522 may be tilted at an angle in order to accommodate the respective pinky of each hand. The hand that serves for a PalmScreen has other contraptions added to the construct, such as the contraptions enabling to convey nibble information to the face and back of the fingers or the back of the hand, while the other hand has only a contraption 530 that enables its thumb to receive nibble information required for notification of start and end of process as is given below. The contraption 530 is a sleeve for the thumb that has thumb-face and thumb-back apertures through each of which is a small moving part, such as a rod, that can impact (peck) on the thumb by touching it briefly, or with a longer time impact, at various impact strengths. The contraption is connected to the entire tTV apparatus so that it receives commands for exerting nibble effects to the thumb at the desired location (face or back) and at the desired duration and strength of impact. Contraption 530 also contains a lever at the top of it, that can be depressed at will as a key and which carries control information from the deafblind. We also discuss below a dual hand contraption.

| Number of Nibbles | Meaning |
|---|---|
| 1 | Start of KeyWord |
| 2 | End of KeyWord |
| 3 | Start of dialogue |
| 4 | Dialogue starts with some other activity in the background or other location on the PalmScreen |
| 5 | End of dialogue |

The single or two nibbles are done in rapid manner, while the 3, 4 or 5 nibbles are provided at a slow manner, thereby signaling to the viewer, right from the outset whether they describe a KeyWord or dialogue. Specifics of nibble operations can change according to and depending on the particular Touch Language used at the time.

Standard TV changes screen colors and hues in accordance with the broadcast content. While it could be beneficial to the deafblind to gain additional alert to scene content by observing changes in lights flickers, even without seeing what appears on the screen, it may also cause interference with perception of the touch language screen. To this end, we introduce added parts to the invention.

For purpose of eliminating light flickers from an active TV screen, a Screen Mute may be provided. The screen mute enables the deafblind to shut off the visual part of the TV, rendering the screen without any light, while only the audio (that can separately be muted such as in standard TVs) and the touch TV code are kept intact. Since such a screen mute function has utility that goes beyond the deafblind, some additional parts are incorporated with it. Namely, some standard TV viewers fall asleep while the TV is in full operation. It is therefore beneficial to include TV timer effects. TV timer effects enable the users additional options, such as: timing a Mute Screen to a particular time, or a certain time from a certain period, unless overridden by the user. Thus, a standard TV user can watch TV, fall asleep and not be disturbed by the light flickers, just keep hearing the audio part until it stops too, according to the user's desire. Another timer function relates to the preprogrammed ability of the TV to switch to such modes as a video or VCR mode and start transmitting material designed for such aspects as relaxation, learning while being asleep, etc. Another timer function allows one to be connected to the Internet, enabling transfer of voice or text to the temporary or fixed delivery system. Such transferred material from the Internet could have various functions, some of which were mentioned before, and others could be for example:

Educational material;
Catalyst for dream generation; and
Relaxing music and/or relaxing words
    for the user himself/herself or
    for a baby in an adjacent room
    for medical or psychological purposes Hearing persons enjoy musical effects while watching TV shows, even if such musical effects are only tones that normally would not be categorized as music, or are subtle in nature. For example, in the classic movie and TV airing of "Jaws", there is a growing crescendo of tones whenever the shark is approaching, creating a sense of foreboding and heightened "anxiety" level among the viewers. Another example is in the movie "Mercury Rising" in the scene on the train where the autistic child is being protected, which is quite close to a functionally equivalent audio of a series of nibbles. Deaf viewers do not share in such effects leading to a significant reduction in their functionally equivalent enjoyment as compared with their hearing counterparts. Deafblind persons who would elect to use touch language in order to partake in a functional equivalent audio-visual effects such as a TV show could improve their level of enjoyment if a functional equivalent form of musical effect could also be provided. So would also deaf persons who watch such a show with close captioning, but where obviously no musical effects can be translated into captioning. Touch language contains the needed elements utilized by the appropriately built contraptions of this invention to enable deafblind viewers to partake in the perception of musical effects, and the apparatus segment described below enables such utility.

That segment can be made of a single mechanical part, or composed of more than one disjoint part as described below. There is more than one embodiment to each version, however we will provide below one disjoint segment and one cohesive segment as examples of the embodiments. The reason for possible disjoint parts emanates from the fact that touch language utilizes two separate excitations to form the functional equivalency of musical effects, which are vibrations and nibbles.

In this embodiment we designate a single body part as the recipient of the excitations. For example we can designate the elbow. In such embodiment, the mechanical cradles for the PalmScreen and fingers rest at one corner on which the hand and fingers rest, while at the other end of the device we rest or fit in our elbow. The device also enables adjustments to variable length of arms. The elbow segment of the contraption can however be disjointed from the hand and finger segment, where a separate mechanical part enables the elbow to rest in it. In either case, we consider it to be a single embodiment due to the fact that both vibrations and nibbles are provided to the same area. Such single embodiments can also be located in other areas of the body, such as a plate attached to the viewer's chest, whereas the plate as a whole vibrates, while one or more isolated areas on it protrude occasionally to provide nibbles when needed.

In such embodiment, we recognize separate mechanical parts for vibrations and nibbles as shown in the examples below:

a plate lying on the floor and on which one rests the feet (with or without shoes) and which vibrates at the times and frequencies provided by touch language; or a separate segment that provides the nibbles can either be worn as a cuff bracelet to provide nibbles at the leg juncture to the foot, or on the kneecap.

Departure from the above embodiments or recombining them with other options could be viable embodiments for enjoyment of functionally equivalent tones built into a structure of composition. Such composed structure could be considered functionally equivalent music. When individuals are not partaking in perceiving a TV show, the hands and fingers are also available to partake in such embodiments. However, the fingertips could be kept free for Braille reading, enabling lyrics to accompany functionally equivalent melody rendering functionally equivalent songs, musicals, operas, etc.

The touch TV apparatus is enhanced when it includes the segments for dual hand operation. The apparatus as a whole is similar to the one presented above for the dialogue segment. It contains a cradle for both hands, where the tips of the fingers can read Braille at the top of the apparatus, both right hand PalmScreen and left hand PalmScreen receive their stimulations and excitations from the bottom part of the apparatus, and the nibbles are provided to the face of the fingers from the cradle itself, while an upper portion provides the nibbles to the back of the fingers and the back of the hand. The apparatus doubles up (for both hands) on the equipment generating vibrations and nibbles. However, each segment (right hand side and left hand side) is autonomous and can function independently of each other, though for a common result as prescribed by touch language.

The apparatus enabling deafblind to partake in TV perception can be equipped with various parts that either contribute to or function as virtual reality for various specific functions. For example, a contraption in front of the face with a moveable part that can protrude and say, touch the nose of the user on command. Another contraption can be overlapping the mouth and which can simulate a kiss on the mouth bestowed on the user.

Any person who is skilled in the art can build such parts that can add yet another dimension of entertainment when desired.

Figure 9:
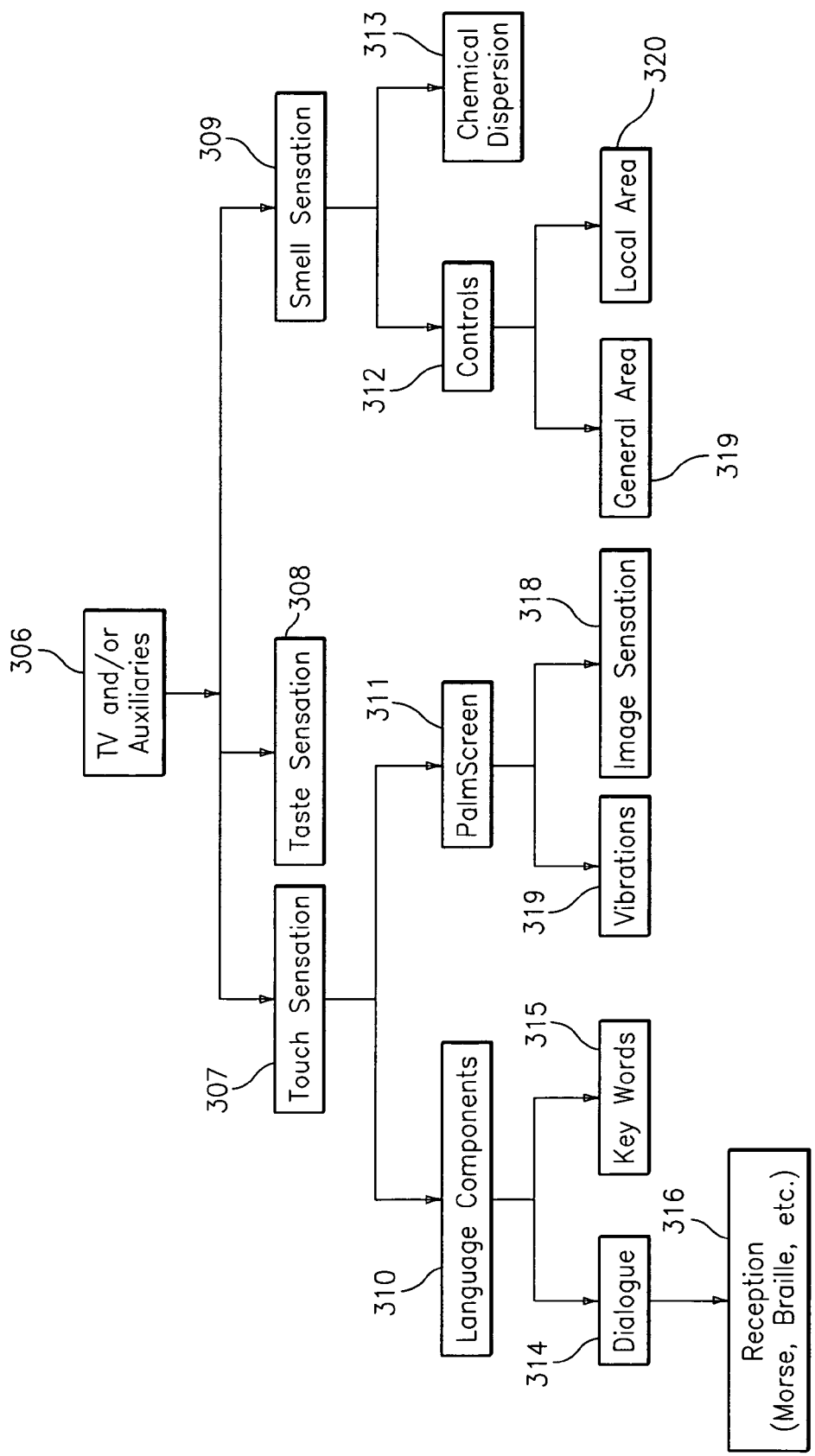
FIG. 9 is a flow diagram of a deafblind person observing television.
Figure 10:
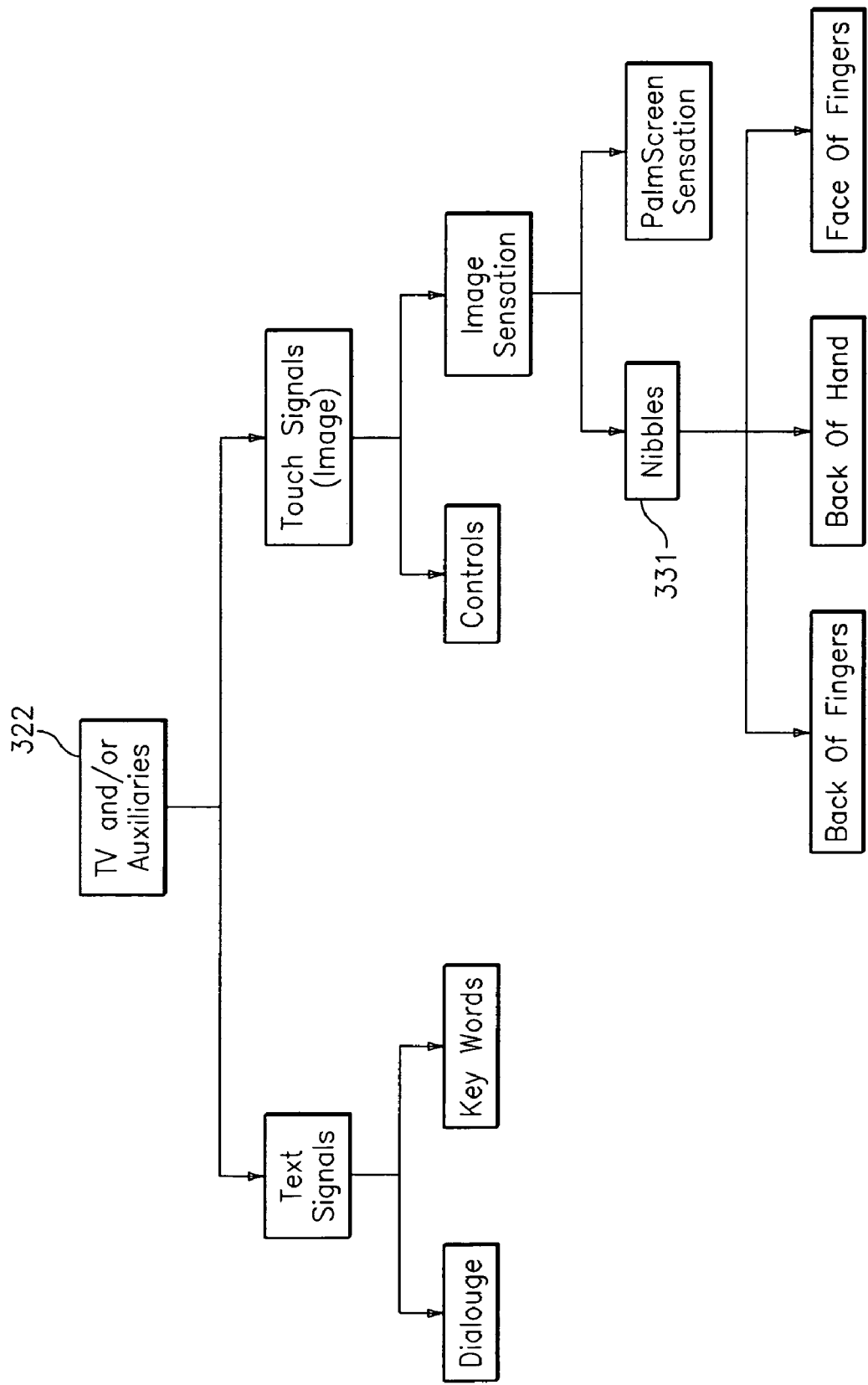
FIG. 10 is a flow diagram showing how a deafblind person can observe television.

FIG. 9 shows the general concept elements 306 of watching a TV show by a deafblind person. The three elements providing functionally equivalency to audio-visual reception are smell sensation 309, taste sensation 308 and touch sensation 307. The smell sensation is provided from timed heated chemical substrates (box 313) as controlled by a suitable control 312, for the general area of the TV "watching" room 319 and localized to specific users 320. The touch sensation 307 is symbiotically related to touch language that has two major components. First, there is the palm screen 311 that is the recipient to vibrations 317 and image sensations in 318. The other component is the language component comprising keywords 315 to assist the descriptions on the PalmScreen and the dialogue part 314 that can handle the reception (box 316) of rapid incoming texts in Braille. FIG. 10 shows the conceptual components of the touch TV mechanism, whereas FIGS. 11, 12 and 13 show the mechanical elements capable of providing the conceptual components in FIG. 10.

Figure 11:
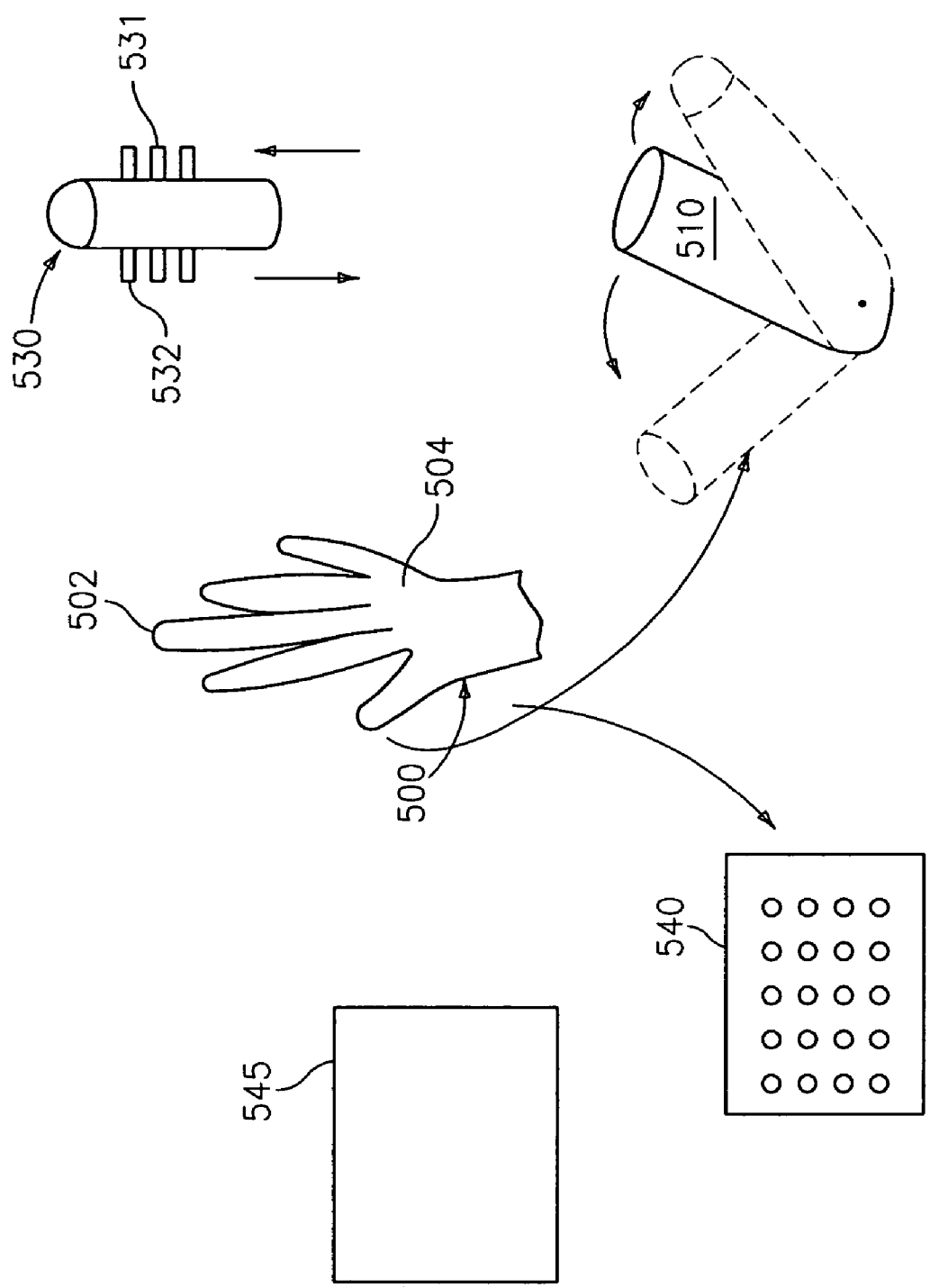
FIG. 11-13 illustrates the components of a touch television system.
Figure 12:
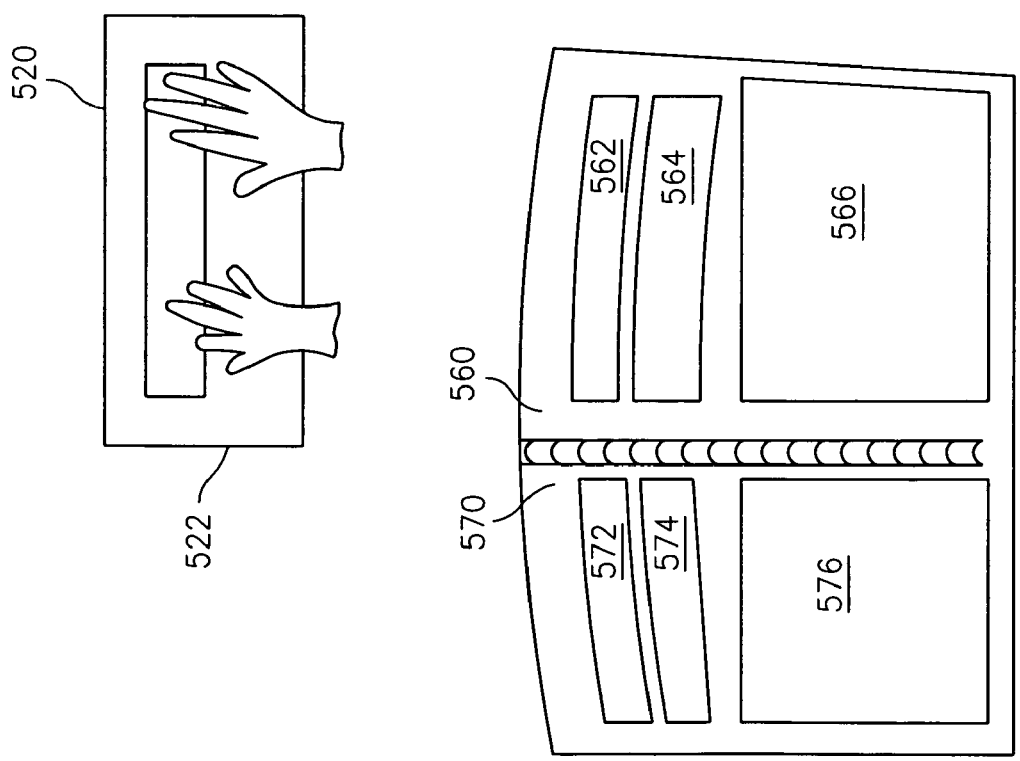

FIG. 11 shows the hand utilized as a PalmScreen with its components for nibble generation and controls. The thumb 500 is inserted into a pivoting cylinder-like host 510, while a mechanical sleeve 530, into which the pinky 504 is inserted, contains mechanical parts 531 and 532 capable of providing a pecking motion referred to as "nibbles". The face of the pinky finger receives its pecking motions from a lower part 532 of the sleeve 530, while the top of the pinky receives its nibbles from part 531. The images on the PalmScreen may appear on the designated block 545, while the nibbles on the back of the hand may be produced by appropriately extruding small cylinders 540.

The touch TV apparatus could support two hands on a pad or panel 520 so that a dialogue could be received in Braille. The embodiment of the apparatus shown in FIG. 12 has a lower segment 560 and an upper segment 570. The lower segment 560 has a Braille pad 562, a nibble segment 564 for the face of the fingers and a PalmScreen area 566. The upper part 570 comprises an area 572, 574 for exerting nibbles to the back of the fingers. The nibbles to the back of the hand are exerted by members in 576.

Figure 13:
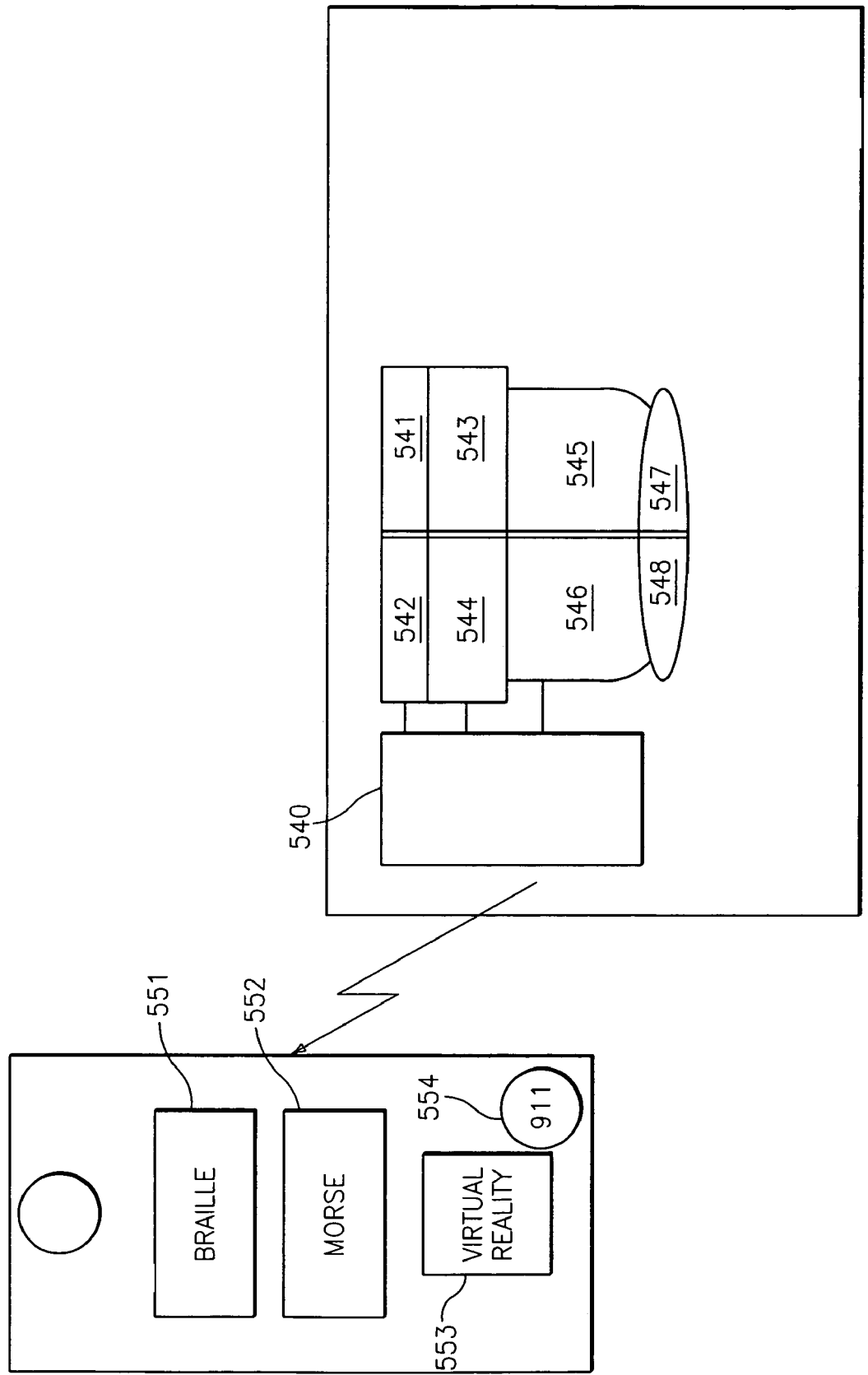

FIG. 13 shows an embodiment for right and left hand pads for the touch TV apparatus with Braille element 541, nibble element(s) 543, PalmScreen 545, and emergency unlock 547 being for the right hand segment, and with Braille element 542, nibble element(s) 544, PalmScreen 546 and emergency unlock 548 being for the left hand segment. A side pad 540 contains mechanical keys that control the apparatus from the outset and can be activated and changed at any instant. Pressing button 551 activates the Braille reader, pressing button 552 activates the Morse system, pressing button 553 activates virtual reality, and pressing button 554 summons 911 help. The dialogue segment for the touch TV can be received in a number of ways. The speech can undergo speech recognition and the text fed to the apparatus, or a relatively simple utility can be made of the close captioning available with the show, which text can be fed into the touch TV apparatus. There is no current way available to signal likewise any taste or smell information to the apparatus of touch language. To do the latter, smell and taste codes will have to be transmitted concurrent with the show, that may be part of a code appearing unobtrusively with the close captioning on the TV and fed into the apparatus.

It is apparent that there has been provided in accordance with the present invention a device to be used by deaf and/or blind individuals, which fully satisfies the objects, means and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

APPENDIX I

Types & Their Specifics
(Partial typical lists)

| Types | |
|---|---|
| 00 | Restroom |
| 01 | Men's room |
| 02 | Ladies room |
| 03 | Conference room |
| 04 | Elevator |

APPENDIX I-continued

Types & Their Specifics
(Partial typical lists)

Types

| | |
|---|---|
| 05 | Room |
| 06 | Soda can room |
| 07 | Desk - hotel |
| 08 | Cashier |
| 09 | Laundry room/Laundromat |
| 10 | Lobby |
| 11 | Restaurant |
| 12 | Bar |
| 13 | Street sign |
| 14 | Bus stop |
| 15 | Train station |
| 16 | Train ramp entrance |

Appendix II

Guide Algorithm

Positioning Location

Given below is an algorithm enabling description and easy tracking or mapping a route plan for eCane users. There are several ways to uniquely describe locations. One embodiment is provided below.

Each area is composed of street blocks that are grouped into a matrix of n×n blocks, where n=1, . . . , 250 and is called a Macro-block.

Each group of numbers spans a Macro-Block of groups of street blocks, where each block has a North to South different odd numbers and West to East different even numbers The odd numbers allocated to a Macro-block, run consecutively from South to North beginning at the Master-block base (South West) towards the top (North West), then continue with the next consecutive number at the base (South) in the next row of blocks and continue again towards the top (North). The last odd number in the sequence will be at the top North East of the Mater-block.

The odd numbers start with "1" at the South West of the master-block and end at the top North East of the Master-block.

The even numbers run consecutively from West to East and are allocated two numbers per each street, one for each side of the street.

The even numbers start with "2" at the South West corner of the Master-block, followed by the number "4" on the other side of the same street.

The total numbers allocated to a Master-block are "1" to "999"

There are 500 even numbers utilized in 250 street blocks.
There are 499 odd numbers utilized in 499 street blocks.
The lay out of numbers forms a triangle, where an odd number is at the top and two even numbers are at the base.

For example in a 3×3 matrix we can have:

```
        1        11
    2     4   18     20
```

There are other ways to represent the Macro-block components. For example, one can use sequential numbers without attention to being odd or even to number the West to East street sides, while using letters to designate the streets from South to North. The principle here being that the triangle nomenclature be observed in order to have street corners and sides uniquely represented. In such cases, the apex of the triangles will be a letter, whereas, the bases will be represented by sequential numbers. For example in a 3×3 Master-block with nine blocks spanning the area:

```
        A           F
    1       2   19      20
```

Thus a person moving in a straight line along the street will be guided through 1A2, 3D4, 5G6.

On the other hand a person can be guided to start from C18 to C10 to B10, then cross to E11 and return back a bit towards F11.

The message or coordinates exchange between an eCane and an environmental component such as a street name-tag can be captured in a sequence of bits and bytes such as is shown below.

MN RSW TU MBI XYZ ABC

Where:
The number of letters in each group of letters represent either a group of letters (two or three) or a group of numbers (two or three).
MN=The State where the Macro-block is located
RSW=The (telephone) area code where the Macro-block is located
TU=Type of the tag, such as NT or SNT
MBI=The Macro-block ID number
XYZ=South to North number or letter
ABC=West to East number

EXAMPLE

NY 212 SNT 037 013 032

Appendix III

Client-Server Authentication

Embodiment of an Algorithm

The authentication is based on certain activities performed at least at one of the pair Client-Server and communication between Client and Server as described below.

Server:
At least one instruction to or comparison with the Client and originating from the Server; Such instruction may cause the Client to position itself at a particular location, use a particular equation or number. For example the Server sends a code that corresponds to a location in a table of numbers pre-arranged at the Client as a matrix, where the column and row are the essence of the code and the client selects the number appearing in the cross section. An example is a 3 by 3 matrix with primary numbers as follows: The columns are A, B, and C; The rows are 1, 2, and 3. That is:

|   | A  | B  | C  |
|---|----|----|----|
| 1 | 3  | 7  | 11 |
| 2 | 13 | 17 | 19 |
| 3 | 21 | 23 | 29 |

Each of the numbers in the matrix can be uniquely defined by its column and row. Thus the number "17" is defined by "B2" and the number "21" is defined by "A3". In our example, if the Server communicates to the Client the code "C3", Client will choose the number "29" as the number it would work with. The Server is aware which final number the Client ends up with.

Client:

The Client transacts at least one activity that may be a calculation based on an equation or a substitution of a number for a variable in an equation or fixing such variable to be a fixed number throughout the duration of the legitimacy of the minutes acquired. For example, if the code from the server was "C3", the Client will take the number 29, divide into it 1000 and come up with 0.0029 to be the fixed number representing the base seconds of time for the calculation and which will be referred to as Coded Fix Minutes (CFM).

Before the Client dials any number at the request of the user, the Client calculates the time difference (provided by the clock in the Client's computer) between the last amount of minutes of use (MOU) left and the previous amount of MOU left before dialing starts. The initial MOU left is the number of minutes purchased by the user. The result is placed in File (A).

Next the Client calculates the same calculation, except that it starts from a base of initial MOU that are the purchased number of minutes PLUS the CFM. The result is kept in a hidden file (B). The CFM trails all the future calculations of MOU.

File (A) and File (B) are compared. A correct comparison will show that the MOU of File (B) equal the MOU of file (A) plus CFM. Such authentication will verify that MOU of file (A) have not been tampered with.

Other embodiments that are based on relationships between Client and Server may take any form and may utilize any variety of equations, random number generations and internal assessment of the Client based on initial instructions given it by the Server upon receiving the initial authorization for MOU.

If a "Phone Card" is associated with the purchase of MOU then such card may contain codes that are utilized by either Client and/or Server in initiating and/or performing of the authentication.

What is claimed is:

1. A device for use by an individual comprising:
   first means for manually inputting a series of words in the form of a code;
   second means for manually inputting an action to be performed by the device;
   third means for manually inputting a preference;
   fourth means for manually inputting communication instructions;
   said device comprising a cane;
   said first means comprising a depressable self-expression key incorporated into said cane;
   said second means comprising a depressable action key incorporated into said cane;
   said third means comprising a depressable selection preference key incorporated into said cane; and
   said fourth means comprising a depressable communication key incorporated into said cane.

2. A device according to claim 1, further comprising a series of rings disposed on a surface of said cane between said keys to identify said keys.

3. A device according to claim 2, wherein each of said rings has at least one elevated portion to identify an adjacent one of said keys.

4. A device for use by a deaf and blind individual comprising:
   a cane to be held in a hand of said deaf and blind person;
   said cane having a first means for manually inputting a series of words in the form of a code;
   said cane having a second means for manually inputting an action to be performed by the device;
   said cane having a third means for manually inputting a preference; and
   said cane having a fourth means for manually inputting communication instructions.

5. A device according to claim 4, wherein said first means, said second means, said third means, and said fourth means comprises depressable keys on said cane.

6. A device according to claim 5, further comprising a mobile phone segment incorporated into said device and actuated by at least one of said keys.

7. A device according to claim 5, further comprising an on/off switch for actuating said device.

8. A device according to claim 5, further comprising an internal processor and a memory associated with said processor.

9. A device according to claim 5, further comprising a vibration element for allowing said handicapped person to receive messages in a code form.

10. A device according to claim 8, further comprising said processor being programmed to facilitate communication with another individual.

11. A device according to claim 10, wherein said processor is programmed to have a text to speech module and a speech recognition module.

12. A device according to claim 11, further comprising a speaker within said device for emitting oral communications to a hearing person and said speaker being in communication with said processor.

13. A device according to claim 11, further comprising a microphone/receiver for receiving sounds in communication with said processor.

14. A device according to claim 8, wherein said processor is programmed so that depressing any two of said keys triggers an emergency call.

15. A device according to claim 8, wherein said processor is programmed to receive a message from a user in code form and to convert said message into a form which can be heard by a hearing person.

16. A device according to claim 8, wherein said processor is programmed to receive an oral communication from another individual and to convert said oral communication into a coded format for transmission to a user of said device.

17. A device according to claim 8, wherein said processor is programmed to perform search and guide functions.

18. A device according to claim 17, wherein said processor is programmed to send signals to a user of said device which detail movement and angle directions.

19. A device according to claim 18, wherein said processor is programmed to transmit said movement and angle direction to said user in the form of a code.

20. A device according to claim 17, wherein said processor is programmed to receive input from a user about a place being sought.

21. A device according to claim 17, wherein said processor is programmed to receive input from a user about an object of interest to said user.

22. A device according to claim 8, wherein said processor is programmed to facilitate communication between said device and another device being used by another person.

23. A device according to claim 22, wherein said processor is programmed to facilitate said communication over a telephone line.

24. A device according to claim 8, wherein said processor is programmed to send emergency information to a user.

25. A device according to claim 24, wherein said processor is programmed to send emergency information received from at least one of a fire alarm, a burglar alarm, and an object theft alarm.

26. A device according to claim 8, wherein said processor is programmed to receive an emergency vehicle alert and for converting said received alert into a coded message to be transmitted to a user of said device.

27. A device according to claim 26, further comprising an emergency vehicle alert system having a RF receiver for capturing a first signal generated by an emergency vehicle and said processor being programmed to receive a second signal generated by said emergency vehicle alert system.

28. A system for allowing a hearing impaired and/or a blind person to enjoy a television program comprising:
   input means for receiving information about an oral presentation being made as part of said television program; and
   means associated with said input means for transmitting a signal to at least one body part of said person representative of words being spoken and non-verbal events occurring as part of said oral presentation.

29. A system according to claim 28, wherein said transmission means comprises means for transmitting an electric current to said at least one body part.

30. A system according to claim 28, wherein said transmission means comprises means for transmitting a vibration to said at least one body part.

31. A system according to claim 28, wherein said transmission means comprises means for transmitting heat to said at least one body part.

32. A system according to claim 28, wherein said transmission means comprises means for transmitting said signal to a front portion and a back portion of said at least one body part.

33. A system according to claim 28, wherein said transmission means comprises means for transmitting said signal in Braille form.

34. A system according to claim 28, further comprising means for shutting off a visual portion of said television program.

35. A system according to claim 28, further comprising means for transmitting odors to said person.

36. A system according to claim 28, further comprising means for allowing said person to summon emergency aid.

37. A system according to claim 28, wherein said transmission means transmits said signal in the form of Morse code.

38. A system according to claim 28, wherein said transmission means comprises means for transmitting nibble information to said at least one body part.

39. A system according to claim 38, wherein said nibble transmitting means transmits said nibble information to both hands of said person.

* * * * *